US009910207B2

(12) United States Patent
Robinson et al.

(10) Patent No.: US 9,910,207 B2
(45) Date of Patent: Mar. 6, 2018

(54) POLARIZATION RECOVERY IN A DIRECTIONAL DISPLAY DEVICE

(71) Applicant: RealD Spark, LLC, Beverly Hills, CA (US)

(72) Inventors: Michael G. Robinson, Boulder, CO (US); Gary D. Sharp, Boulder, CO (US); Graham J. Woodgate, Henley-on-Thames (GB); Jonathan Harrold, Leamington Spa (GB); Miller H. Schuck, Erie, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 75 days.

(21) Appl. No.: 14/993,042

(22) Filed: Jan. 11, 2016

(65) Prior Publication Data

US 2016/0209576 A1    Jul. 21, 2016

Related U.S. Application Data

(63) Continuation of application No. 13/837,466, filed on Mar. 15, 2013, now Pat. No. 9,235,057.

(Continued)

(51) Int. Cl.
*G02B 27/26* (2006.01)
*G02B 27/28* (2006.01)
(Continued)

(52) U.S. Cl.
CPC ............ *G02B 6/0048* (2013.01); *F21V 13/12* (2013.01); *G02B 6/0056* (2013.01); *G02B 27/225* (2013.01); *G02B 27/2264* (2013.01)

(58) Field of Classification Search
CPC ...... G02B 6/2706; G02B 6/126; G02B 6/105; G02B 6/27; G02B 6/2726; G02B 6/1228;
(Continued)

(56) References Cited

U.S. PATENT DOCUMENTS 1,128,979 A  2/1915 Hess
1,970,311 A  8/1934 Ives
(Continued)

FOREIGN PATENT DOCUMENTS

CN  1142869 A  2/1997
CN  1377453 A  10/2002
(Continued)

OTHER PUBLICATIONS

AU-2013262869 Australian Office Action of Australian Patent Office dated Feb. 22, 2016.
(Continued)

*Primary Examiner* — Jade R Chwasz
(74) *Attorney, Agent, or Firm* — Penny L. Lowry; Neil G. Mothew

(57) ABSTRACT

Disclosed is an imaging directional backlight polarization recovery apparatus including an imaging directional backlight with at least a polarization sensitive reflection component with optional polarization transformation and redirection elements. Viewing windows may be formed through imaging individual light sources and hence defines the relative positions of system elements and ray paths. The base imaging directional backlight systems provide substantially unpolarized light primarily for the illumination of liquid crystal displays (LCDs) resulting in at least 50% loss in light output when using a conventional sheet polarizer as input to the display. The invention herein introduces a polarization sensitive reflecting element to separate desired and undesired polarization states for the purposes of transformation and redirection of the reflected light for usable illumination. Polarization transformation and redirection can be provided by additional components such as retarder films and specular mirror surfaces.

21 Claims, 30 Drawing Sheets

Related U.S. Application Data

(60) Provisional application No. 61/649,116, filed on May 18, 2012.

(51) Int. Cl.
*G02B 5/30* (2006.01)
*F21V 8/00* (2006.01)
*G02B 27/22* (2018.01)
*F21V 13/12* (2006.01)

(58) Field of Classification Search
CPC .......... G02B 6/00; G02B 5/30; G02B 6/0028; G02B 6/0033; G02B 6/2931; G02F 1/133528; G02F 1/0136; G02F 1/011; G02F 1/00; G02F 1/0134
USPC ..... 359/464, 465, 466, 475, 483.01, 484.01, 359/485.01
See application file for complete search history.

(56) References Cited

U.S. PATENT DOCUMENTS

| | | |
|---|---|---|
| 2,133,121 A | 10/1938 | Stearns |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Bamea |
| 5,796,451 A | 8/1998 | Kim |
| 5,808,792 A | 9/1998 | Woodgate et al. |
| 5,850,580 A | 12/1998 | Taguchi et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,959,702 A | 9/1999 | Goodman |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,044,196 A | 3/2000 | Winston et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,144,118 A | 11/2000 | Cahill et al. |
| 6,172,723 B1 | 1/2001 | Inoue et al. |
| 6,199,995 B1 | 3/2001 | Umemoto et al. |
| 6,219,113 B1 | 4/2001 | Takahara |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,335,999 B1 | 1/2002 | Winston et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,481,849 B2 | 11/2002 | Martin et al. |
| 6,654,156 B1 | 11/2003 | Crossland et al. |
| 6,663,254 B2 | 12/2003 | Ohsumi |
| 6,724,452 B1 | 4/2004 | Takeda et al. |
| 6,731,355 B2 | 5/2004 | Miyashita |
| 6,736,512 B2 | 5/2004 | Balogh |
| 6,801,243 B1 | 10/2004 | Berkel |
| 6,816,158 B1 | 11/2004 | Lemelson et al. |
| 6,825,985 B2 | 11/2004 | Brown et al. |
| 6,847,354 B2 | 1/2005 | Vranish |
| 6,847,488 B2 | 1/2005 | Travis |
| 6,859,240 B1 | 2/2005 | Brown et al. |
| 6,867,828 B2 | 3/2005 | Taira et al. |
| 6,870,671 B2 | 3/2005 | Travis |
| 6,883,919 B2 | 4/2005 | Travis |
| 7,052,168 B2 | 5/2006 | Epstein et al. |
| 7,058,252 B2 | 6/2006 | Woodgate et al. |
| 7,073,933 B2 | 7/2006 | Gotoh et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,415 B2 | 5/2007 | Maehara et al. |
| 7,215,475 B2 | 5/2007 | Woodgate et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,528,893 B2 | 5/2009 | Schultz et al. |
| 7,545,429 B2 | 6/2009 | Travis |
| 7,587,117 B2 | 9/2009 | Winston et al. |
| 7,614,777 B2 | 11/2009 | Koganezawa et al. |
| 7,660,047 B1 | 2/2010 | Travis et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,944,428 B2 | 5/2011 | Travis |
| 7,970,246 B2 | 6/2011 | Travis et al. |
| 7,976,208 B2 | 7/2011 | Travis |
| 8,016,475 B2 | 9/2011 | Travis |
| 8,216,405 B2 | 7/2012 | Emerton et al. |
| 8,223,296 B2 | 7/2012 | Lee et al. |
| 8,325,295 B2 | 12/2012 | Sugita et al. |
| 8,354,806 B2 | 1/2013 | Travis et al. |
| 8,477,261 B2 | 7/2013 | Travis et al. |
| 8,502,253 B2 | 8/2013 | Min |
| 8,534,901 B2 | 9/2013 | Panagotacos et al. |
| 8,556,491 B2 | 10/2013 | Lee |
| 8,651,725 B2 | 2/2014 | Ie et al. |
| 8,714,804 B2 | 5/2014 | Kim et al. |
| 8,752,995 B2 | 6/2014 | Park |
| 9,197,884 B2 | 11/2015 | Lee et al. |
| 2001/0001566 A1 | 5/2001 | Moseley et al. |
| 2001/0050686 A1 | 12/2001 | Allen |
| 2002/0018299 A1 | 2/2002 | Daniell |
| 2002/0113246 A1 | 8/2002 | Nagai et al. |
| 2002/0113866 A1 | 8/2002 | Taniguchi et al. |
| 2003/0046839 A1 | 3/2003 | Oda et al. |
| 2003/0137738 A1 | 7/2003 | Ozawa et al. |
| 2003/0137821 A1 | 7/2003 | Gotoh et al. |
| 2004/0008877 A1 | 1/2004 | Leppard et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0105264 A1 | 6/2004 | Spero |

(56) References Cited

U.S. PATENT DOCUMENTS

| | | |
|---|---|---|
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0094295 A1 | 5/2005 | Yamashita et al. |
| 2005/0110980 A1 | 5/2005 | Maehara et al. |
| 2005/0135116 A1 | 6/2005 | Epstein et al. |
| 2005/0174768 A1 | 8/2005 | Conner |
| 2005/0180167 A1 | 8/2005 | Hoelen et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0274956 A1 | 12/2005 | Bhat |
| 2005/0276071 A1 | 12/2005 | Sasagawa et al. |
| 2005/0280637 A1 | 12/2005 | Ikeda et al. |
| 2006/0012845 A1 | 1/2006 | Edwards |
| 2006/0056166 A1 | 3/2006 | Yeo et al. |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0183466 A1 | 8/2007 | Son et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2008/0079662 A1 | 4/2008 | Saishu et al. |
| 2008/0084519 A1 | 4/2008 | Brigham et al. |
| 2008/0086289 A1 | 4/2008 | Brott |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0174700 A1 | 7/2009 | Daiku |
| 2009/0190072 A1 | 7/2009 | Nagata et al. |
| 2009/0190079 A1 | 7/2009 | Saitoh |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0091254 A1 | 4/2010 | Travis et al. |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0302135 A1 | 12/2010 | Larson et al. |
| 2010/0309296 A1 | 12/2010 | Harrold et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0043501 A1 | 2/2011 | Daniel |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0187293 A1 | 8/2011 | Travis |
| 2011/0187635 A1 | 8/2011 | Lee et al. |
| 2011/0188120 A1 | 8/2011 | Tabirian et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0062991 A1 | 3/2012 | Mich et al. |
| 2012/0075285 A1 | 3/2012 | Oyagi et al. |
| 2012/0086776 A1 | 4/2012 | Lo |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0169838 A1 | 7/2012 | Sekine |
| 2012/0206050 A1 | 8/2012 | Spero |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0299913 A1 | 11/2012 | Robinson et al. |
| 2012/0314145 A1 | 12/2012 | Robinson |
| 2013/0101253 A1 | 4/2013 | Popovich et al. |
| 2013/0107340 A1 | 5/2013 | Wong et al. |
| 2013/0135588 A1 | 5/2013 | Popovich et al. |
| 2013/0169701 A1 | 7/2013 | Whitehead et al. |
| 2013/0307831 A1 | 11/2013 | Robinson et al. |
| 2013/0307946 A1 | 11/2013 | Robinson et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0022619 A1 | 1/2014 | Woodgate et al. |
| 2014/0240828 A1 | 8/2014 | Robinson et al. |
| 2014/0340728 A1 | 11/2014 | Taheri |

FOREIGN PATENT DOCUMENTS

| | | |
|---|---|---|
| CN | 1454329 A | 11/2003 |
| CN | 1466005 A | 1/2004 |

(56) References Cited

FOREIGN PATENT DOCUMENTS

| | | |
|---|---|---|
| CN | 1487332 A | 4/2004 |
| CN | 1696788 A | 11/2005 |
| CN | 1823292 A | 8/2006 |
| CN | 1826553 A | 8/2006 |
| CN | 1866112 A | 11/2006 |
| CN | 2872404 | 2/2007 |
| CN | 1307481 | 3/2007 |
| CN | 101029975 A | 9/2007 |
| CN | 101049028 A | 10/2007 |
| CN | 200983052 | 11/2007 |
| CN | 101142823 A | 3/2008 |
| CN | 100449353 | 1/2009 |
| CN | 101364004 A | 2/2009 |
| CN | 101598863 B | 12/2009 |
| CN | 100591141 | 2/2010 |
| CN | 202486493 U | 10/2012 |
| EP | 0721131 A2 | 7/1996 |
| EP | 0830984 A2 | 3/1998 |
| EP | 0833183 A1 | 4/1998 |
| EP | 0860729 A2 | 8/1998 |
| EP | 0939273 A1 | 9/1999 |
| EP | 2003394 A2 | 12/2008 |
| EP | 1394593 B1 | 6/2010 |
| EP | 2451180 A2 | 5/2012 |
| EP | 1634119 B1 | 8/2012 |
| GB | 2405542 | 2/2005 |
| JP | H07270792 | 10/1995 |
| JP | H08211334 | 8/1996 |
| JP | H08254617 | 10/1996 |
| JP | H08340556 | 12/1996 |
| JP | H11242908 | 9/1999 |
| JP | 2000131683 A | 5/2000 |
| JP | 2000200049 A | 7/2000 |
| JP | 2001093321 A | 4/2001 |
| JP | 2002049004 A | 2/2002 |
| JP | 2003215349 A | 7/2003 |
| JP | 2003215705 A | 7/2003 |
| JP | 2004319364 A | 11/2004 |
| JP | 2005135844 A | 5/2005 |
| JP | 2005181914 A | 7/2005 |
| JP | 2005183030 A | 7/2005 |
| JP | 2005259361 A | 9/2005 |
| JP | 2006004877 A | 1/2006 |
| JP | 2006031941 A | 2/2006 |
| JP | 2006310269 A | 11/2006 |
| JP | 2007094035 A | 4/2007 |
| JP | 3968742 B2 | 8/2007 |
| JP | 2007273288 A | 10/2007 |
| JP | 2007286652 | 11/2007 |
| JP | 2008204874 A | 9/2008 |
| JP | 2010160527 A | 7/2010 |
| KR | 20030064258 | 7/2003 |
| KR | 20090932304 | 12/2009 |
| KR | 20110006773 A | 1/2011 |
| KR | 20110017918 A | 2/2011 |
| KR | 20110067534 A | 6/2011 |
| KR | 20120048301 A | 5/2012 |
| KR | 20120049890 A | 5/2012 |
| KR | 20130002646 A | 1/2013 |
| TW | 573145 B | 1/2004 |
| TW | 200528780 | 9/2005 |
| WO | 1994006249 B1 | 4/1994 |
| WO | 1995020811 A1 | 8/1995 |
| WO | 1995027915 A1 | 10/1995 |
| WO | 1999011074 A1 | 3/1999 |
| WO | 2001027528 A1 | 4/2001 |
| WO | 2001061241 A1 | 8/2001 |
| WO | 2001079923 A1 | 10/2001 |
| WO | 2008038539 A1 | 4/2008 |
| WO | 2011020962 A1 | 2/2011 |
| WO | 2011022342 A2 | 2/2011 |
| WO | 2011068907 A1 | 6/2011 |
| WO | 2011149739 A2 | 12/2011 |

OTHER PUBLICATIONS

Bahadur, "Liquid crystals applications and uses," World Scientific, vol. 1, pp. 178 (1990).
CN-201180065590.0 Office first action dated Dec. 31, 2014.
CN-201180065590.0 Office second action dated Oct. 21, 2015.
CN-201180065590.0 Office Third action dated Jun. 6, 2016.
CN-201380026047.9 Chinese 1st Office Action of the State Intellectual Property Office of P.R. dated Dec. 18, 2015.
CN-201380026050.0 Chinese 1st Office Action of the State Intellectual Property Office of P.R. dated Jun. 3, 2016.
CN-201380026059.1 Chinese 1st Office Action of the State Intellectual Property Office of P.R. dated Apr. 25, 2016.
CN-201380026076.5 Office first action dated May 11, 2016.
CN-201380049451.8 Chinese Office Action of the State Intellectual Property Office of P.R. dated Apr. 5, 2016.
EP-07864751.8 European Search Report dated Jun. 1, 2012.
EP-07864751.8 Supplementary European Search Report dated May 29, 2015.
EP-11842021.5 Office Action dated Oct. 2, 2015.
EP-13758536.0 European Extended Search Report of European Patent Office dated Feb. 4, 2016.
EP-13790013.0 European Extended Search Report of European Patent Office dated Jan. 26, 2016.
EP-13790141.9 European Extended Search Report of European Patent Office dated Feb. 11, 2016.
EP-13790195.5 European Extended Search Report of European Patent Office dated Mar. 2, 2016.
EP-13790267.2 European Extended Search Report of European Patent Office dated Feb. 25, 2016.
EP-13790274.8 European Extended Search Report of European Patent Office dated Feb. 8, 2016.
EP-13790775.4 European Extended Search Report of European Patent Office dated Oct. 9, 2015.
EP-13790809.1 European Extended Search Report of European Patent Office dated Feb. 16, 2016.
EP-13790942.0 European Extended Search Report of European Patent Office dated May 23, 2016.
EP-13791332.3 European Extended Search Report of European Patent Office dated Feb. 1, 2016.
EP-13791437.0 European Extended Search Report of European Patent Office dated Oct. 14, 2015.
EP-13843659.7 European Extended Search Report of European Patent Office dated May 10, 2016.
EP-13844510.1 European Extended Search Report of European Patent Office dated May 13, 2016.
PCT/US2013/041683 International search report and written opinion of international searching authority dated Aug. 27, 2013.
JP-2013540083 Notice of reasons for rejection dated Jun. 30, 2015.
PCT/US2013/041655 International search report and written opinion of international searching authority dated Aug. 27, 2013.
PCT/US2013/041619 International search report and written opinion of international searching authority dated Aug. 27, 2013.
Kalantar, et al. "Backlight Unit With Double Surface Light Emission," J. Soc. Inf. Display, vol. 12, Issue 4, pp. 379-387 (Dec. 2004).
Languy et al., "Performance comparison of four kinds of flat nonimaging Fresnel lenses made of polycarbonates and polymethyl methacrylate for concentrated photovoltaics", Optics Letters, 36, pp. 2743-2745.
Lipton, "Stereographics: Developers' Handbook", Stereographic Developers Handbook, Jan. 1, 1997, XP002239311, p. 42-49.
PCT/US2013/041548 International search report and written opinion of international searching authority dated Aug. 27, 2013.
PCT/US2007/85475 International search report and written opinion dated Apr. 10, 2008.
PCT/US2013/041237 International search report and written opinion of international searching authority dated May 15, 2013.
PCT/US2009/060686 international search report and written opinion of international searching authority dated Dec. 10, 2009.
PCT/US2011/061511 International search report and written opinion of international searching authority dated Jun. 29, 2012.
PCT/US2011/061511 International Preliminary Report on Patentability dated May 21, 2013.

(56) References Cited

OTHER PUBLICATIONS

PCT/US2012/037677 International search report and written opinion of international searching authority dated Jun. 29, 2012.
PCT/US2012/042279 International search report and written opinion of international searching authority dated Feb. 26, 2013.
PCT/US2012/052189 International search report and written opinion of the international searching authority dated Jan. 29, 2013.
PCT/US2013/041192 International search report and written opinion of international searching authority dated Aug. 28, 2013.
PCT/US2013/041228 International search report and written opinion of international searching authority dated Aug. 23, 2013.
PCT/US2013/041235 International search report and written opinion of international searching authority dated Aug. 23, 2013.
PCT/US2013/041697 International search report and written opinion of international searching authority dated Aug. 23, 2013.
PCT/US2013/041703 International search report and written opinion of international searching authority dated Aug. 27, 2013.
PCT/US2013/049969 International search report and written opinion of international searching authority dated Oct. 23, 2013.
PCT/US2013/063125 International search report and written opinion of international searching authority dated Jan. 20, 2014.
PCT/US2013/063133 International search report and written opinion of international searching authority dated Jan. 20, 2014.
PCT/US2013/077288 International search report and written opinion of international searching authority dated Apr. 18, 2014.
PCT/US2014/017779 International search report and written opinion of international searching authority dated May 28, 2014.
PCT/US2014/042721 International search report and written opinion of international searching authority dated Oct. 10, 2014.
PCT/US2014/060312 International search report and written opinion of international searching authority dated Jan. 19, 2015.
PCT/US2014/060368 International search report and written opinion of international searching authority dated Jan. 14, 2015.
PCT/US2014/065020 International search report and written opinion of international searching authority dated May 21, 2015.
PCT/US2015/021583 International search report and written opinion of international searching authority dated Sep. 10, 2015.
PCT/US2015/038024 International search report and written opinion of international searching authority dated Dec. 30, 2015.
Robinson et al., U.S. Appl. No. 14/751,878 entitled "Directional privacy display" filed Jun. 26, 2015. The application is available to Examiner on the USPTO database and has not been filed herewith.
Robinson et al., U.S. Appl. No. 15/097,750 entitled "Wide angle imaging directional backlights" filed Apr. 13, 2016. The application is available to Examiner on the USPTO database and has not been filed herewith.
Robinson et al., U.S. Appl. No. 15/098,084 entitled "Wide angle imaging directional backlights" filed Apr. 13, 2016. The application is available to Examiner on the USPTO database and has not been filed herewith.
Robinson, U.S. Appl. No. 13/300,293 entitled "Directional flat illuminators" filed Nov. 18, 2011. The application is available to Examiner on the USPTO database and has not been filed herewith.
RU-2013122560 First office action dated Jan. 1, 2014.
RU-2013122560 Second office action dated Apr. 10, 2015.
Tabiryan et al., "The Promise of Diffractive Waveplates," Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
CN-201380026050.0 Chinese 2nd Office Action of the State Intellectual Property Office of P.R. dated Apr. 1, 2017.
JP 2015-512810 1st Office Action (translated) dated Feb. 7, 2017.
TW-102117413 Taiwan Office Action (translated) dated Jul. 19, 2017.

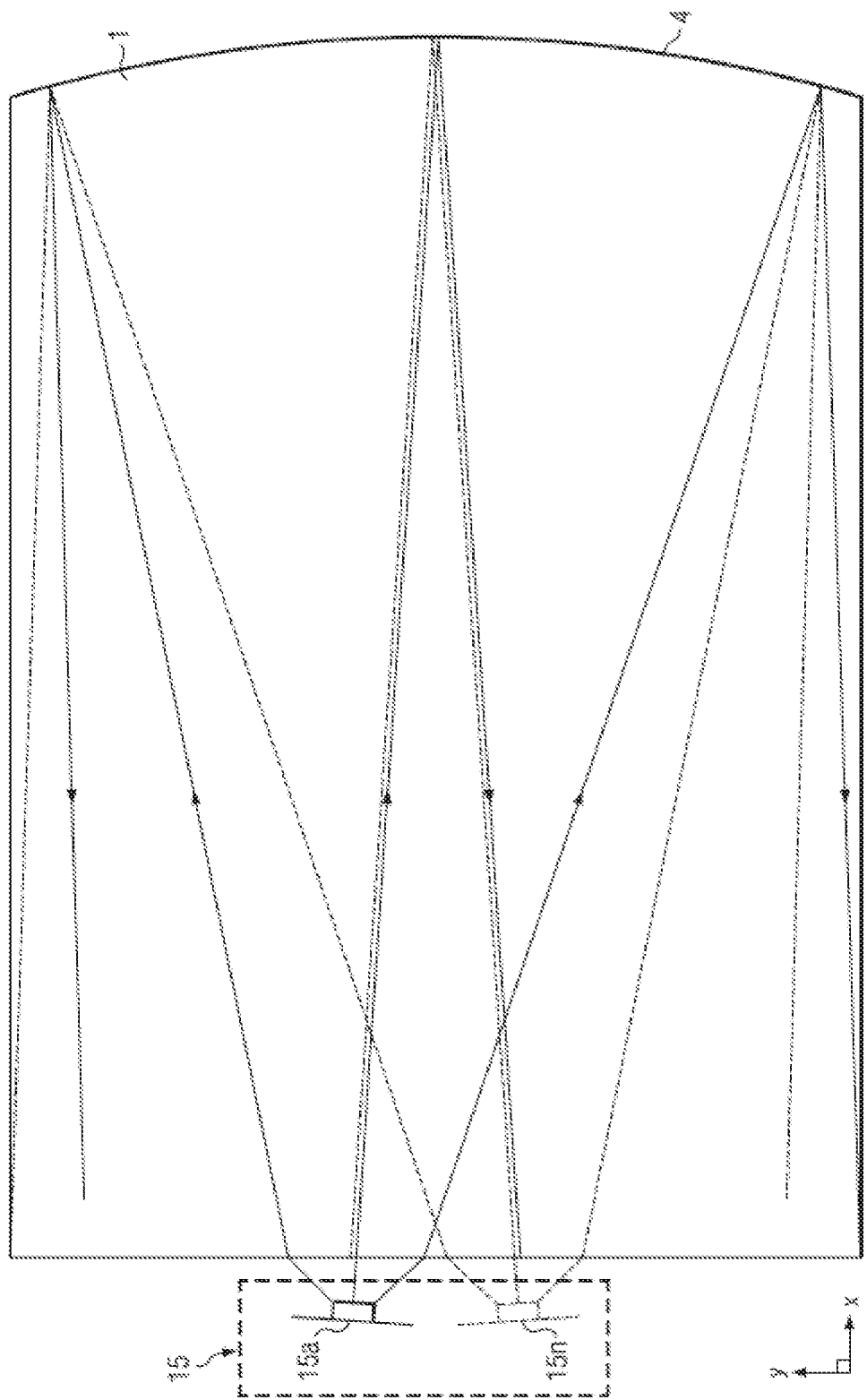

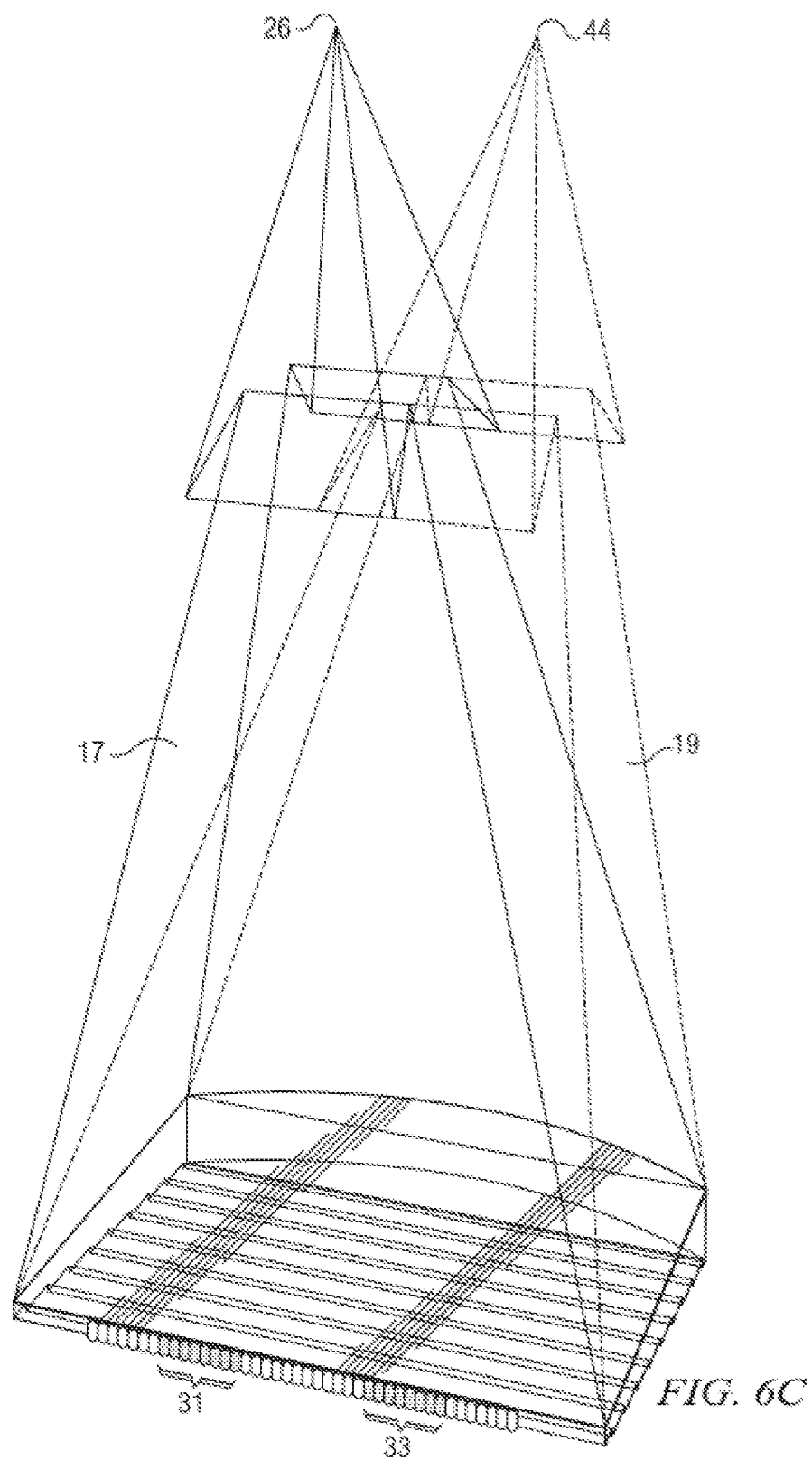

POLARIZATION RECOVERY IN A DIRECTIONAL DISPLAY DEVICE

CROSS-REFERENCE TO RELATED APPLICATIONS

This application is a continuation of U.S. patent application Ser. No. 13/837,466 entitled "Polarization recovery in imaging directional backlights", filed Mar. 15, 2013, which claims priority to U.S. Provisional Patent Application No. 61/649,116, entitled "Polarization recovery in imaging directional backlights." filed May 18, 2012, the entirety of which is herein incorporated by reference. Additionally, this application is related to U.S. Provisional Patent Application No. 61/791,112 entitled "Directional Backlight," to Robinson et al., filed on Mar. 15, 2013, which is herein incorporated by reference in its entirety.

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can include addressing electronics in the spatial light modulator.

BRIEF SUMMARY

According to a first aspect of the present disclosure, there is provided a directional display device which may include a waveguide having an input end. The directional display device may also include an array of light sources disposed at different input positions across the input end of the waveguide. The waveguide may further include first and second, opposed guide surfaces for guiding light along the waveguide. The first guide surface may be arranged to guide light by total internal reflection. The second guide surface may include light extraction features oriented to reflect light guided through the waveguide in directions allowing exit through the first guide surface as output light and intermediate regions between the light extraction features that are arranged to direct light through the waveguide without extracting it. The waveguide may be arranged to direct input light from different light sources through the first guide surface as the output light into respective optical windows in output directions distributed in the lateral direction in dependence on the input. The directional display device may also include a transmissive spatial light modulator which may be arranged to receive the output light from the first guide surface and arranged to modulate a first polarization component of the output light having a first polarization. The directional display device may also include a reflective polarizer which may be disposed between the first guide surface of the waveguide and the spatial light modulator and arranged to transmit the first polarization component and to reflect a second polarization component of the output light having a polarization orthogonal to the first polarization as rejected light. Further, the directional display device may also include a rear reflector which may be disposed behind the second guide surface arranged to reflect the rejected light for supply back to the spatial light modulator, the directional display device further being arranged to convert the polarization of the rejected light supplied back to spatial light modulator into the first polarization.

Advantageously the present embodiments may achieve increased utilization of light in systems using a transmissive spatial light modulator requiring polarised input light. Display brightness may be increased, battery lifetime may be extended and the display may be used in brighter ambient environments. Further, the viewing windows may be provided for light from the backlight that is of both incident polarisation states so that the display has high brightness in a directional mode of operation. Thus a high brightness efficient directional display that may be provided for autostereoscopic 3D display, privacy display and high efficiency 2D displays.

According to a further aspect of the present disclosure, there may be provided a polarized directional illumination apparatus, which may include an imaging directional backlight. The imaging directional backlight may include a waveguide for guiding light. The waveguide may include a first light guiding surface operable to direct light from an illuminator array in a first direction and a second light guiding surface, operable to allow light to exit the waveguide, and a light input surface operable to receive light from the illuminator array, and a polarization sensitive reflector proximate to the first light guiding surface of the waveguide and for providing at least polarization selective reflection.

According to a further aspect of the present disclosure, there may be provided an imaging directional backlight which may include an input side located at a first end of a waveguide, wherein the input side is operable to receive light from at least an illuminator array, a reflective side located at a second end of the waveguide, a first light directing side and a second light directing side located between the input side and the reflective side of the waveguide. The second light directing side may be operable to allow light to exit the waveguide. The imaging directional backlight may also include a polarization sensitive reflector proximate to the first light directing side of the waveguide and for providing at least polarization selective reflection.

According to a further aspect of the present disclosure, there may be provided an optical valve system that provides polarization recovery, which may include a waveguide for guiding light. The waveguide may include a first light guiding surface and a second light guiding surface, opposite the first light guiding surface. The waveguide may further include at least one guiding feature and a plurality of extraction features. The plurality of extraction features may allow light to pass with substantially low loss when the light is propagating in a first direction and allow light to exit the waveguide upon encountering at least a first extraction feature of the plurality of extraction features. The optical valve system may include a spatial light modulator which may be proximate to the waveguide and a polarization sensitive reflector proximate to the first light directing side of the waveguide and for providing at least polarization selective reflection.

According to other aspects of the present disclosure, a polarized directional illumination apparatus may include an imaging directional backlight and a reflective polarizer proximate to the first light guiding surface of the waveguide and for providing at least polarization selective reflection. The imaging directional backlight may include a waveguide for guiding light. The waveguide may include a first light guiding surface operable to direct light from an illuminator array in a first direction, a second light guiding surface, operable to allow light to exit the waveguide, and a light input surface operable to receive light from the illuminator array.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293, which is herein incorporated by reference, in its entirety.

In general with directional backlight systems, the illuminating light is unpolarized resulting in at least 50% loss of the light in the conventional sheet pre-polarizer of an LCD system. In some conventional backlight units, the light of the incorrect polarization can be recovered by using a reflective sheet polarizer to direct the light back into the diffuse reflecting, polarization mixing elements of the structure. A greater efficiency can be expected in imaging directional backlight systems modified for polarization recovery by virtue of the controlled nature of the light's propagation.

In one embodiment, a reflecting polarizer layer directs light of an undesired polarization state back through the waveguide portion of an imaging directional backlight. This light may be transformed in polarization before being reflected back though the reflecting polarizer and adds to the now substantially uniformly polarized illuminating beam.

In another aspect of this invention, unpolarized light sources may be independently coupled to localized polarization recovery systems which may include reflective polarizer layers, polarization manipulating means and directional reflectors.

Disclosed is an imaging directional backlight polarization recovery apparatus including an imaging directional backlight with at least a polarization sensitive reflection component with optional polarization transformation and redirection elements. Candidate imaging directional backlights may include a wedge-type directional backlight, an optical inline directional backlight, or an optical valve. The optical valve may include a waveguide, a light source array, and a focusing optic for providing large area directed illumination from localized light sources. The waveguide may include a stepped structure, in which the steps further include extraction features hidden to guided light, propagating in a first forward direction. Returning light propagating in a second backward direction may be refracted, diffracted, or reflected by the features to provide discrete illumination beams exiting from the top surface of the waveguide. Viewing windows may be formed through imaging individual light sources and hence defines the relative positions of system elements and ray paths. The base imaging directional backlight systems provide substantially unpolarized light primarily for the illumination of liquid crystal displays (LCDs) resulting in at least 50% loss in light output when using a conventional sheet polarizer as input to the display. The embodiments herein introduce a polarization sensitive reflecting element to separate desired and undesired polarization states for the purposes of transformation and redirection of the reflected light for usable illumination. Polarization transformation and redirection can be provided by additional components such as retarder films and specular mirror surfaces.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and tight eye viewing for time sequential stereoscopic and autostereoscopic display; and low cost.

The various aspects of the present invention and the various features thereof may be applied together in any combination.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 1A is a schematic diagram illustrating a front view of light propagation in one embodiment of a directional display device, in accordance with the present disclosure;

FIG. 29 is a schematic diagram illustrating light propagation in a front view of the directional display device of FIG. 2A, in accordance with the present disclosure;

FIG. 6C is a schematic diagram illustrating another embodiment of the generation of a first and a second viewing window in a time multiplexed directional display device, in accordance with the present disclosure;

DETAILED DESCRIPTION

Figure 1B:
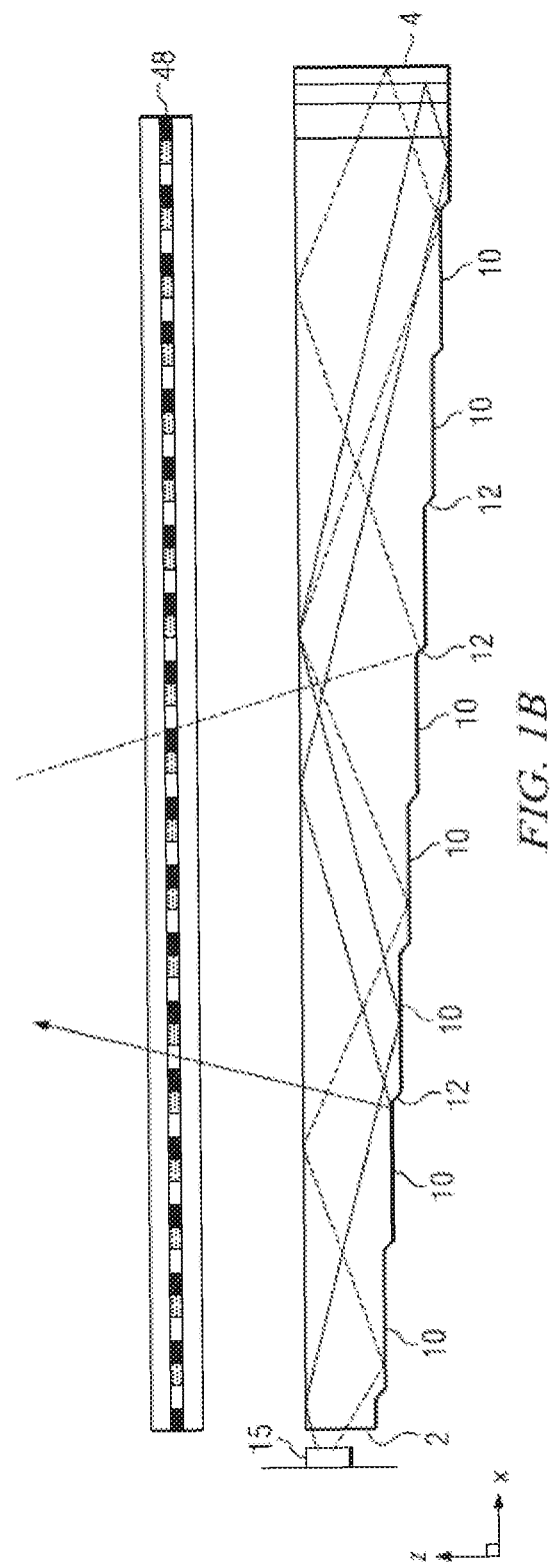
FIG. 1B is a schematic diagram illustrating a side view of light propagation in one embodiment of the directional display device of FIG. 1A, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., Kälil Kälantär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293, which is herein incorporated by reference in its entirety.

As used herein, examples of an imaging directional backlight include a stepped waveguide imaging directional backlight, a folded imaging directional backlight, a wedge type directional backlight, or an optical valve.

Additionally, as used herein, a stepped waveguide imaging directional backlight may be an optical valve. A stepped waveguide is a waveguide for an imaging directional backlight including a waveguide for guiding light, further including a first light guiding surface; and a second light guiding surface, opposite the first light guiding surface, further including a plurality of light guiding features interspersed with a plurality of extraction features arranged as steps.

Moreover, as used, a folded imaging directional backlight may be at least one of a wedge type directional backlight, or an optical valve.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM (spatial light modulator) 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1 by total internal reflection. The first guide surface is planar. The second guide surface has a plurality of light extraction features 12 facing the reflective end 4 and inclined to reflect at least some of the light guided back through the waveguide 1 from the reflective end in directions that break the total internal reflection at the first guide surface and allow output through the first guide surface, for example, upwards in FIG. 1B, that is supplied to the SLM 48.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape including of the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide is transmissive and modulates the light passing therethrough. Although the SLM 48 may be a liquid crystal display (LCD) but this is merely by way of example, and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
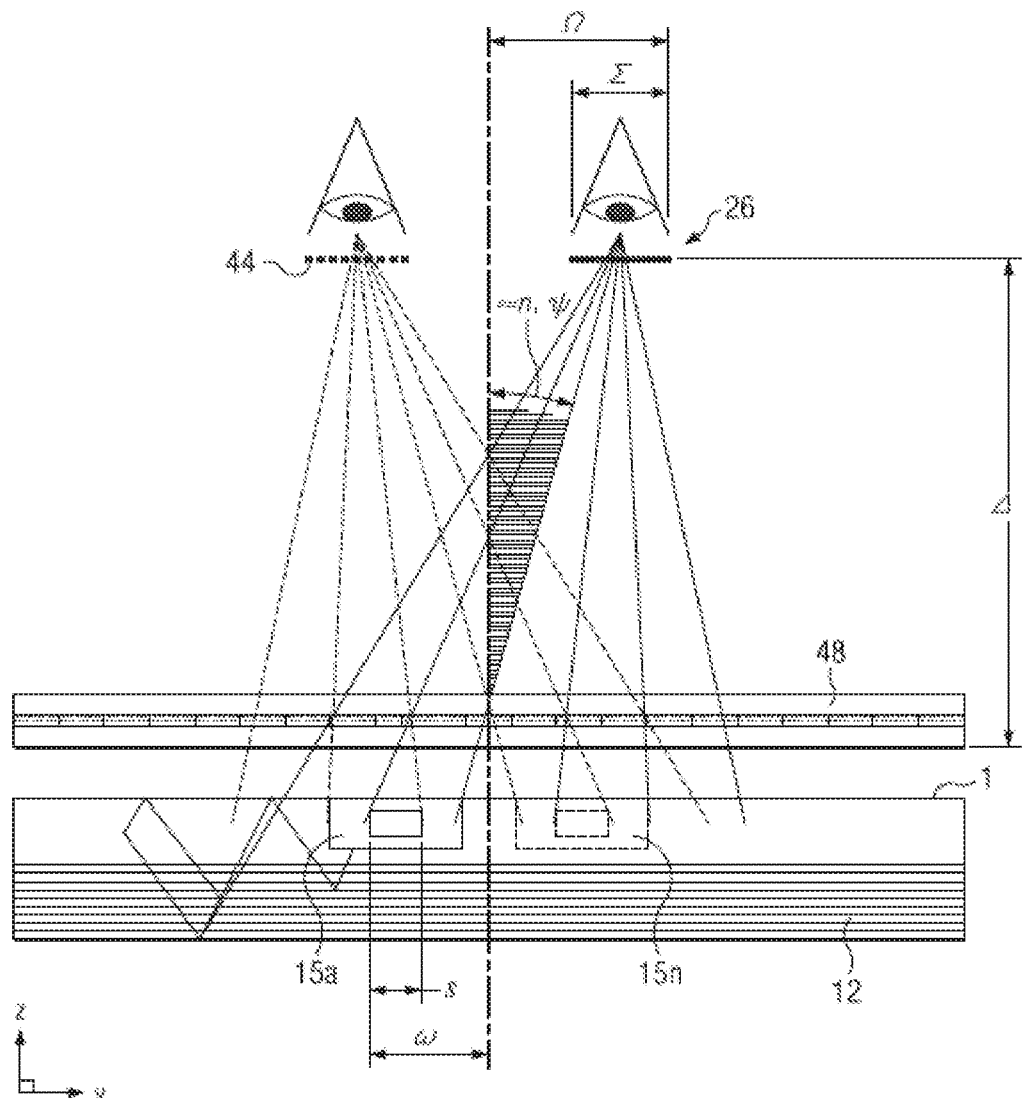
FIG. 2A is a schematic diagram illustrating in a top view of light propagation in another embodiment of a directional display device, in accordance with the present disclosure.
Figure 2B:
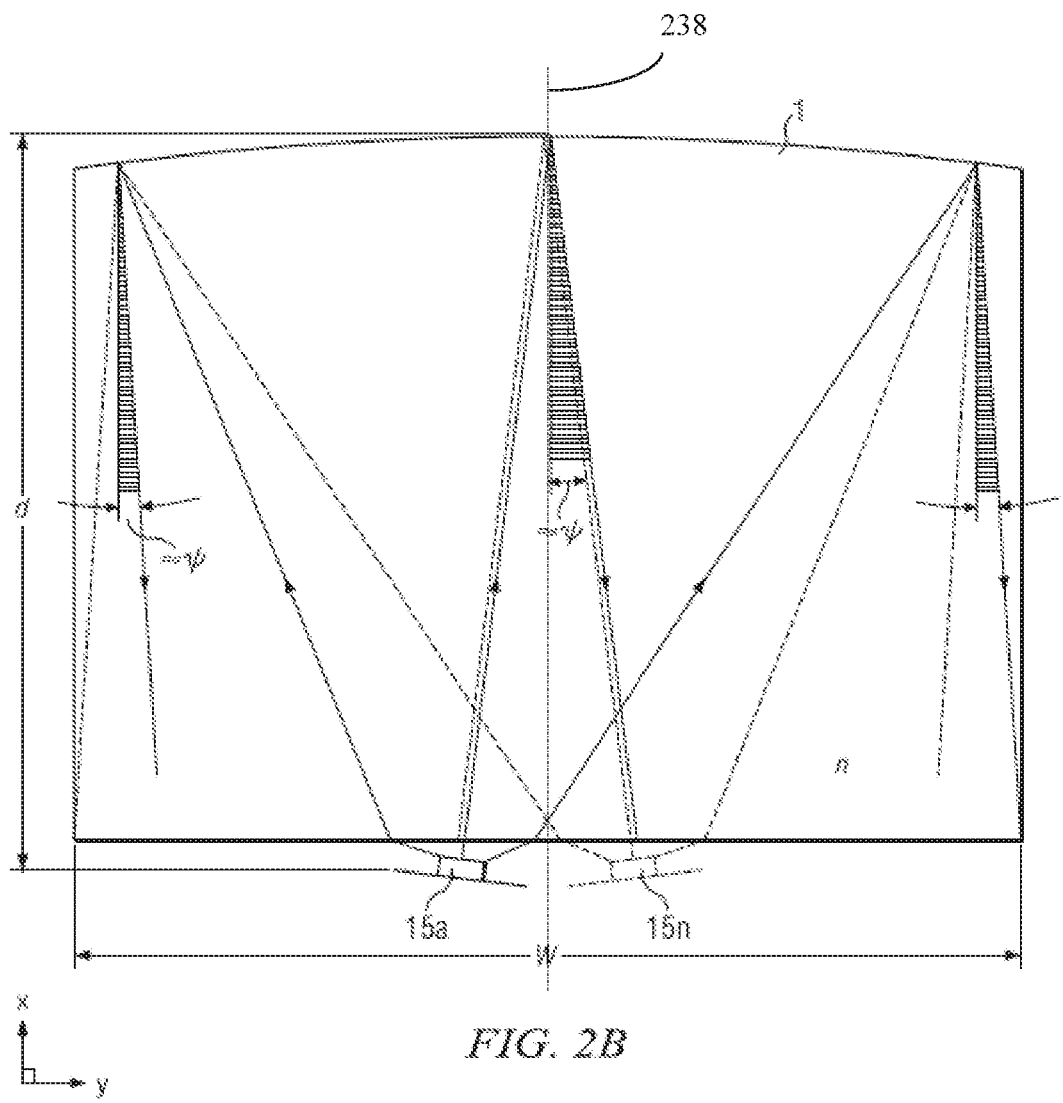
FIG. 2C is a schematic diagram illustrating light propagation in a side view of the directional display device of FIG. 2A, in accordance with the present disclosure.
Figure 2C:
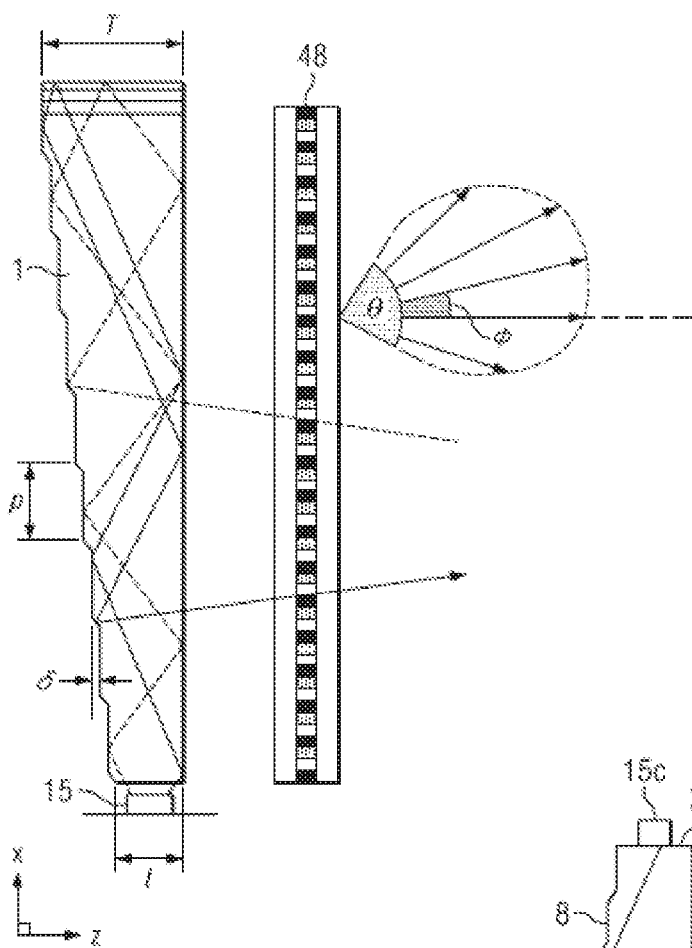

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the centre of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. The cylindrical reflecting surface at end 4 may typically be a spherical profile to optimize performance for on-axis and off-axis viewing positions. Other profiles may be used.

Figure 3:
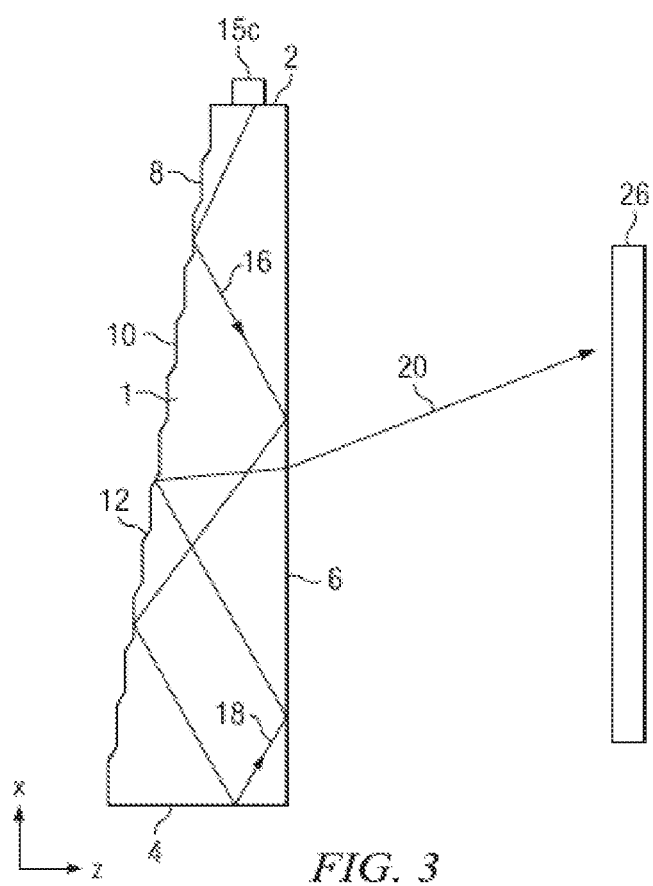
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
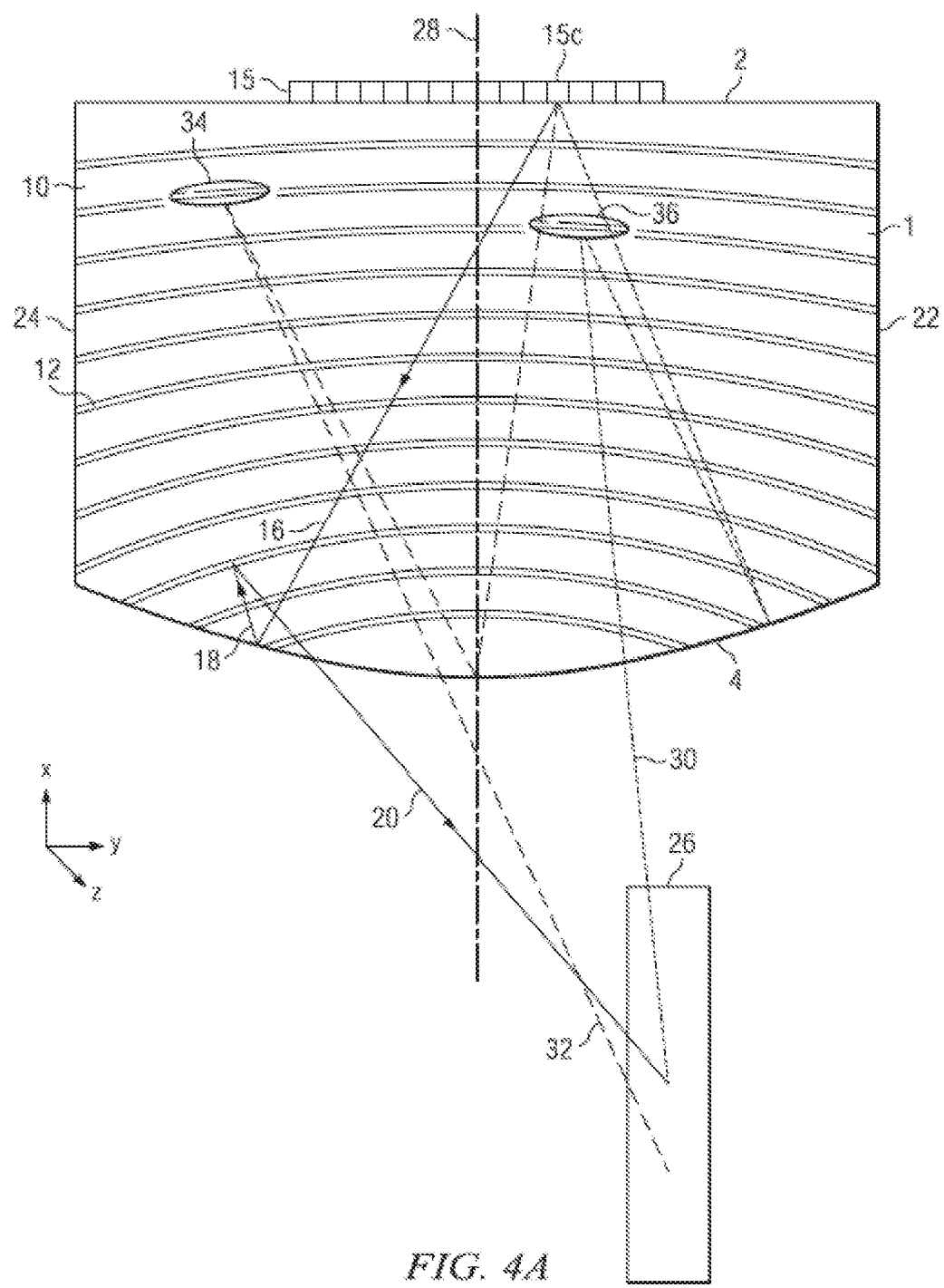
FIG. 4A is schematic diagram illustrating in a front view, generation of a viewing window in a directional display device and including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1 having an optical axis 28. In FIG. 4A, the directional backlight may include the stepped waveguide 1 and the light source illuminator array 15. Each of the output rays are directed from the input side 2 towards the same viewing window 26 from the respective illuminator 15c. The light rays of FIG. 4A may exit the reflective side 4 of the stepped waveguide 1. As shown in FIG. 4A, ray 16 may be directed from the illuminator element 15c towards the reflective side 4. Ray 18 may then reflect from a light extraction feature 12 and exit the reflective side 4 towards the viewing window 26. Thus light ray 30 may intersect the ray 20 in the viewing window 26, or may have a different height in the viewing window as shown by ray 32. Additionally, in various embodiments, sides 22, 24 of the waveguide 1 may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8. Similar to other embodiments discussed herein, for example as illustrated in FIG. 3, the light extraction features of FIG. 4A may alternate with the guiding features 10. As illustrated in FIG. 4A, the stepped waveguide 1 may include a reflective surface on reflective side 4. In one embodiment, the reflective end of the stepped waveguide 1 may have positive optical power in a lateral direction across the stepped waveguide 1.

In another embodiment, the light extraction features 12 of each directional backlight may have positive optical power in a lateral direction across the waveguide.

In another embodiment, each directional backlight may include light extraction features 12 which may be facets of the second guide surface. The second guide surface may have regions alternating with the facets that may be arranged to direct light through the waveguide without substantially extracting it.

Figure 4B:
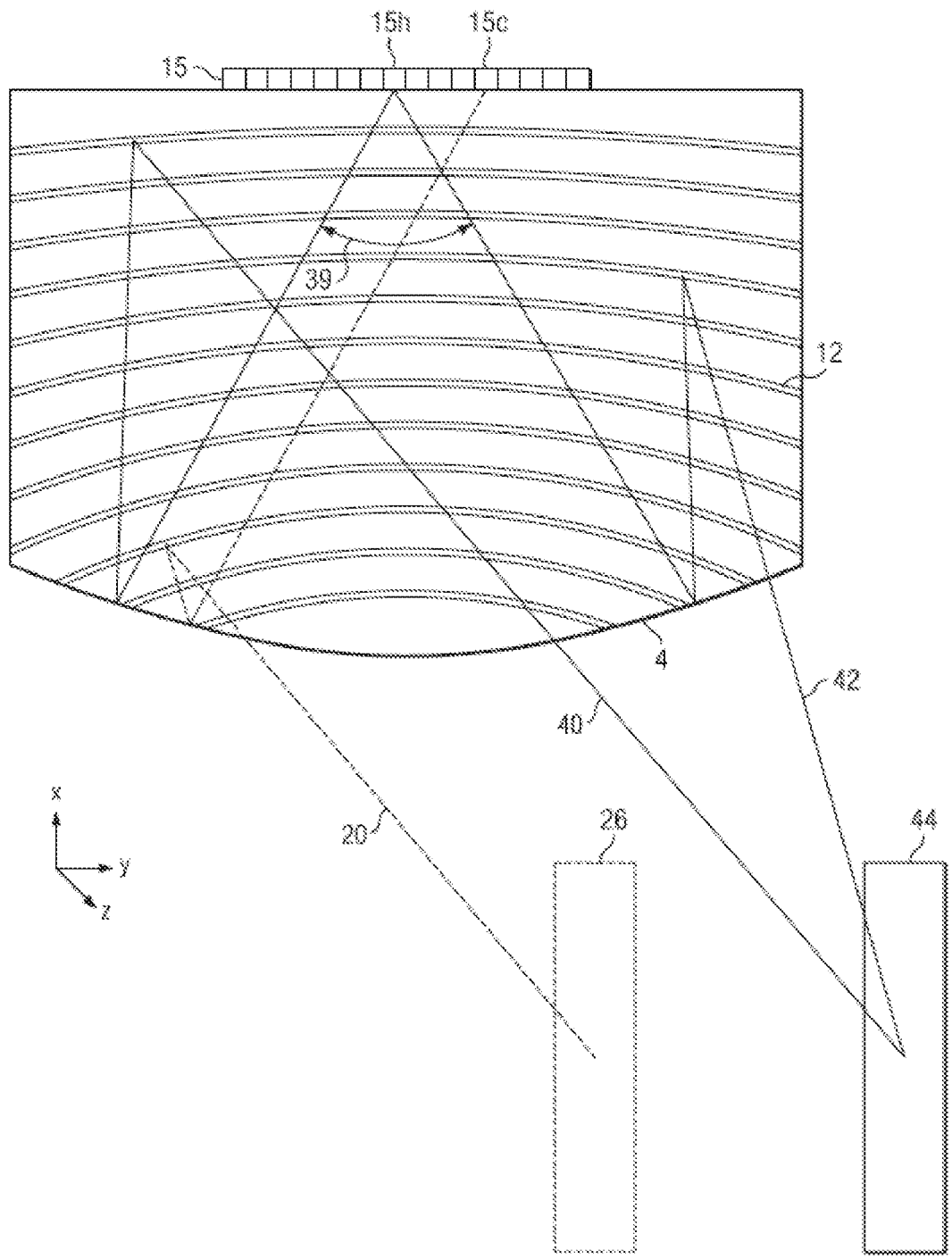
FIG. 4B is a schematic diagram illustrating in a front view, generation of a first and a second viewing window in a directional display device and including curved light extraction features, in accordance with the present disclosure.

FIG. 4B is a schematic diagram illustrating in front view a directional display device which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
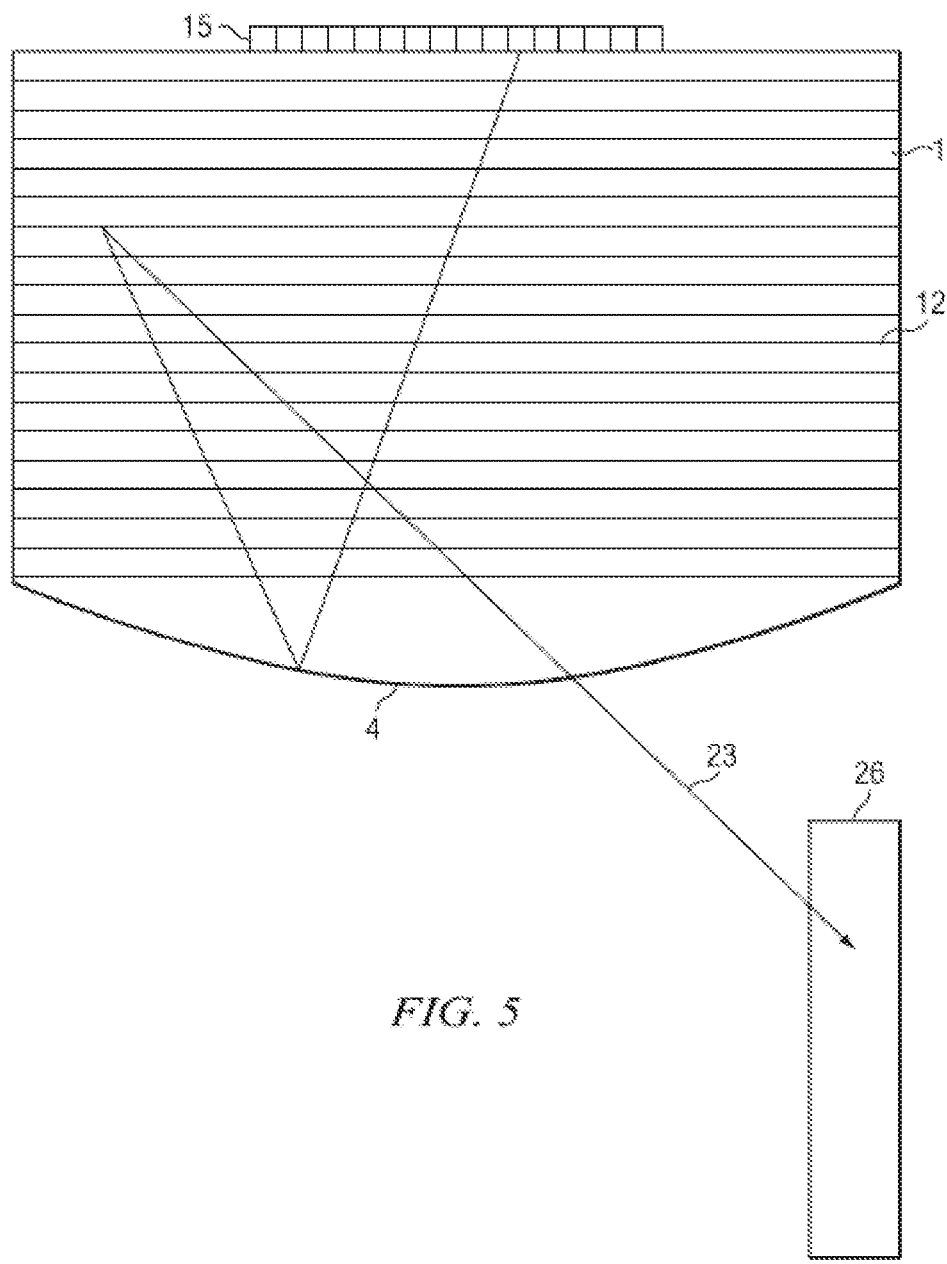
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B. The optical axis 321 of the directional waveguide 1 may be the optical axis direction of the surface at side 4. The optical power of the side 4 is arranged to be across the optical axis direction, thus rays incident on the side 4 will have an angular deflection that varies according to the lateral offset 319 of the incident ray from the optical axis 321.

Figure 6A:
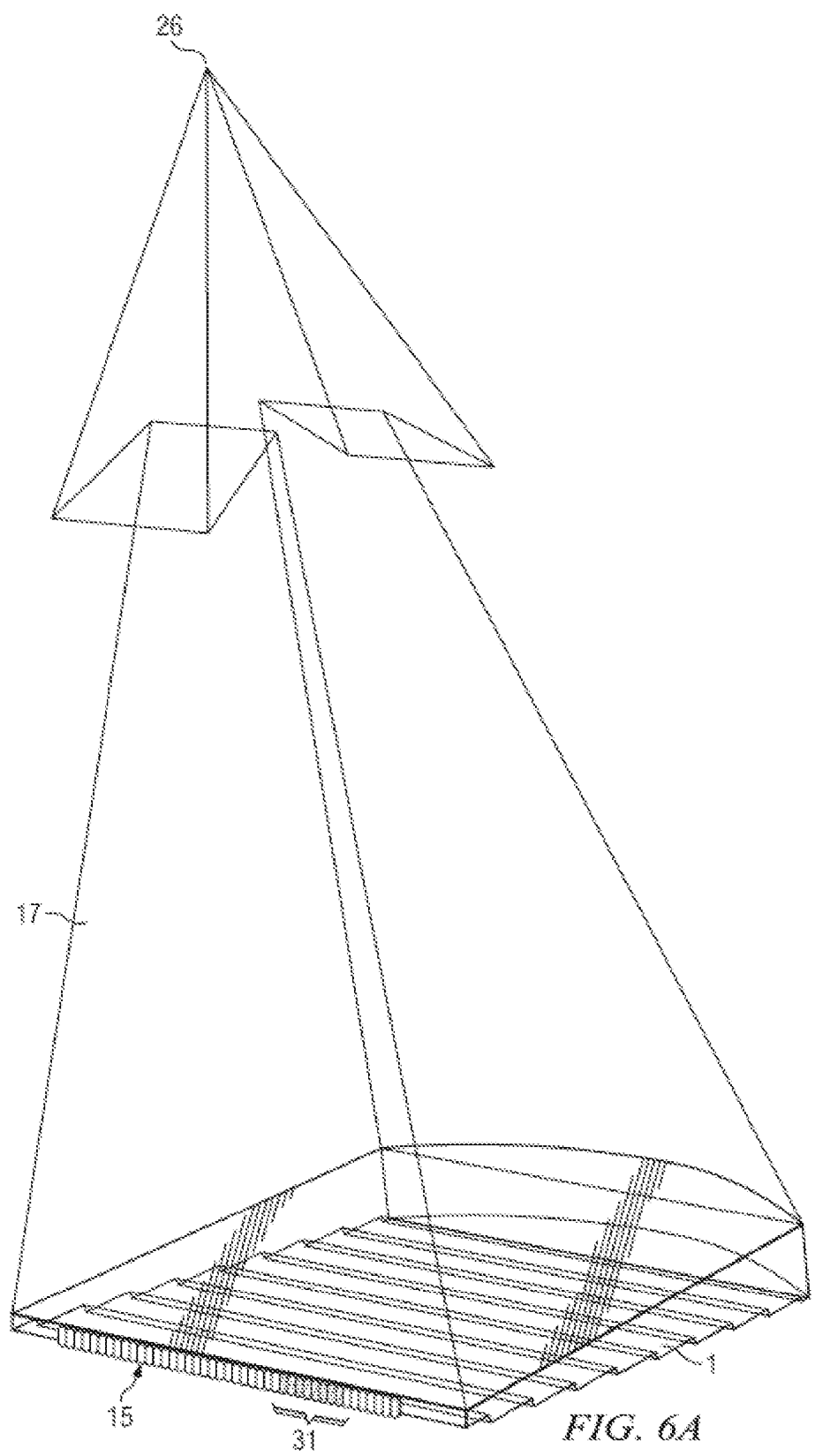
FIG. 6A is a schematic diagram illustrating one embodiment of the generation of a first viewing window in a time multiplexed directional display device, in accordance with the present disclosure.
Figure 6B:
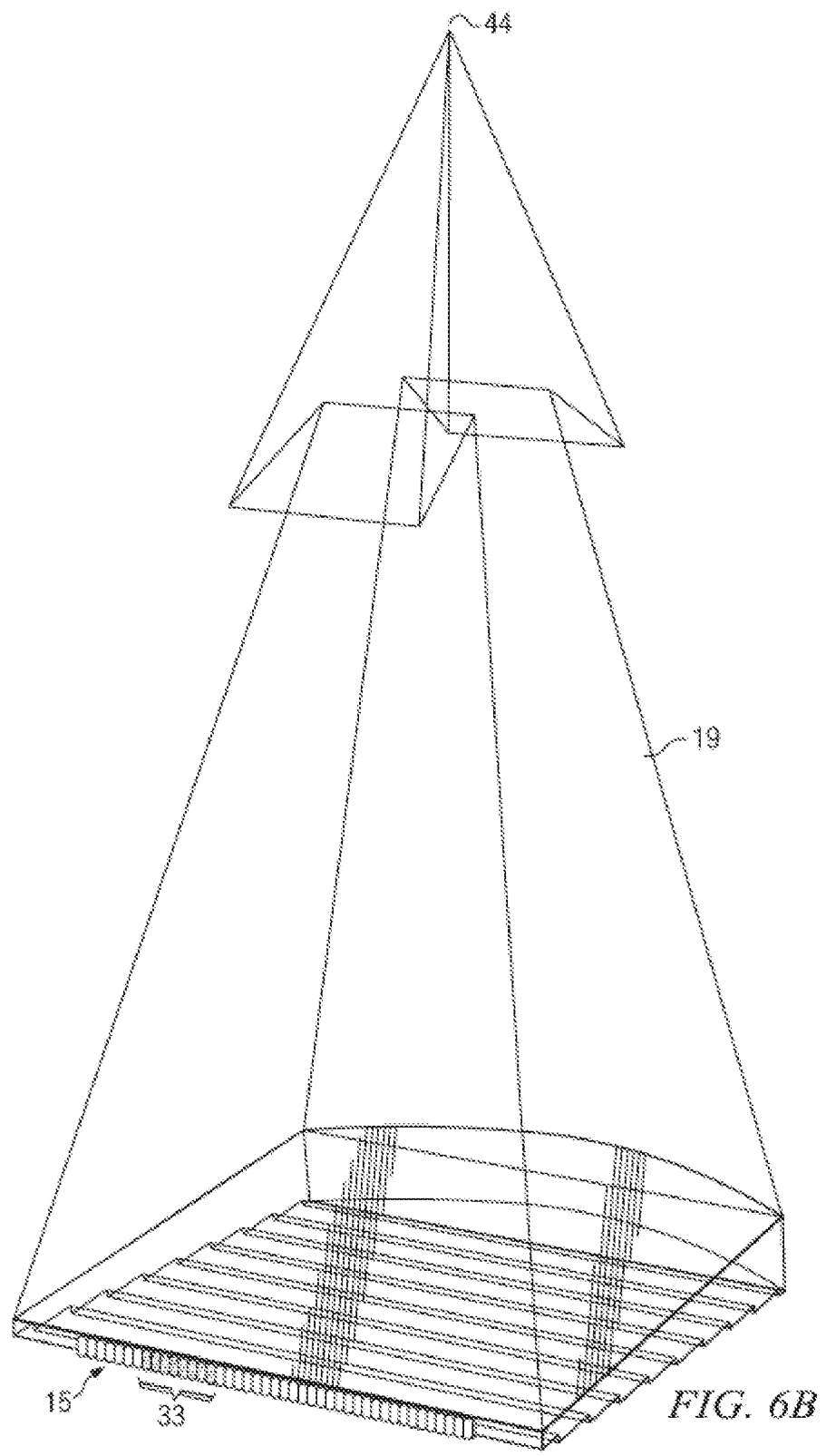
FIG. 6B is a schematic diagram illustrating another embodiment of the generation of a second viewing window in a time multiplexed directional display device in a second time slot, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of viewing window 26 from stepped waveguide 1. Illuminator element group 31 in illuminator array 15 may provide a light cone 17 directed towards a viewing window 26. FIG. 6B shows schematically the generation of viewing window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the imaging directional backlights described herein. Note that illuminator element groups 31, 33 each include one or more illumination elements from illumination elements 15a to 15n, where n is an integer greater than one.

Figure 7:
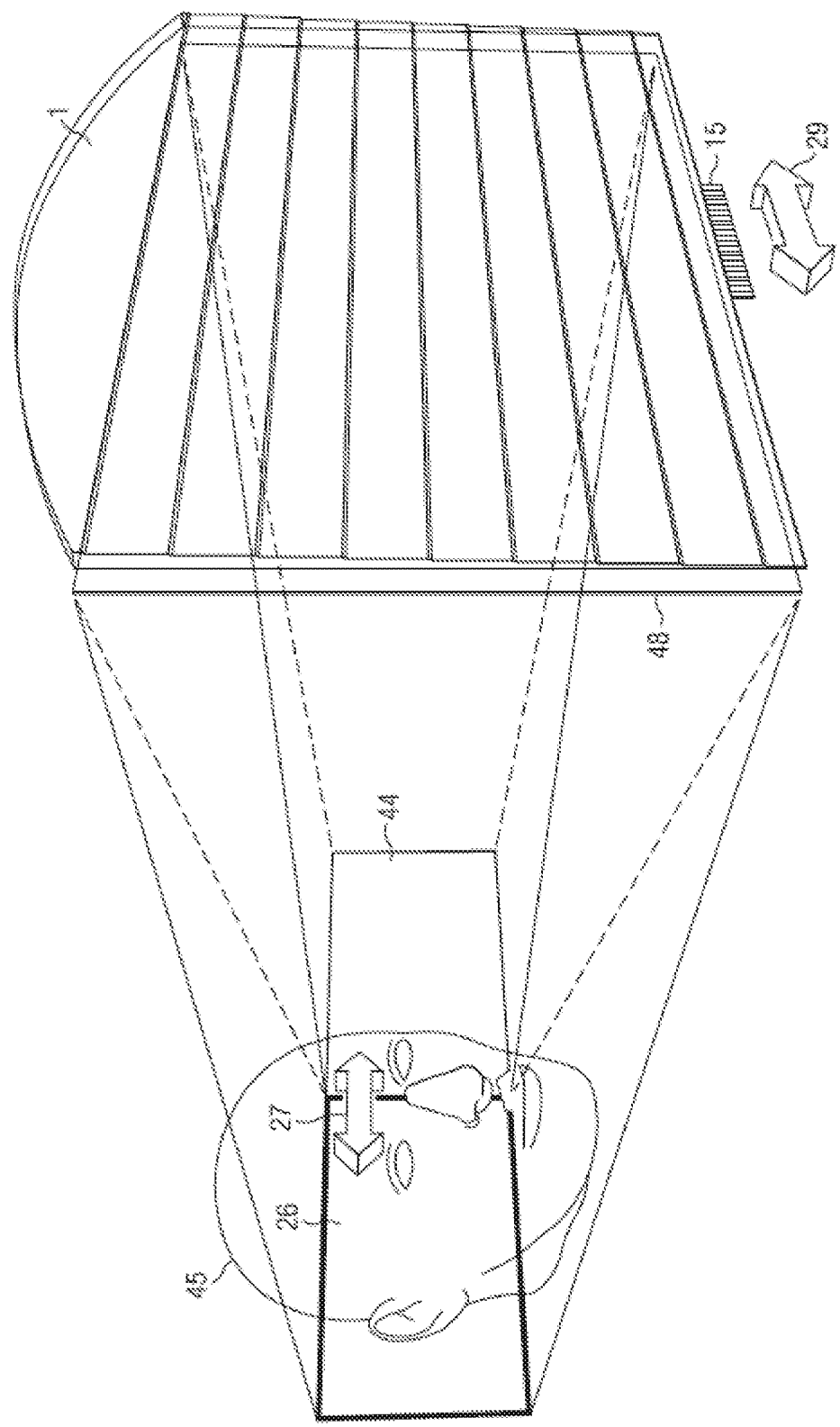
FIG. 7 is a schematic diagram illustrating an observer tracking autostereoscopic directional display device, in accordance with the present disclosure.

FIG. 7 is a schematic diagram illustrating one embodiment of an observer tracking autostereoscopic display apparatus including a time multiplexed directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the imaging directional backlights described herein.

Figure 8:
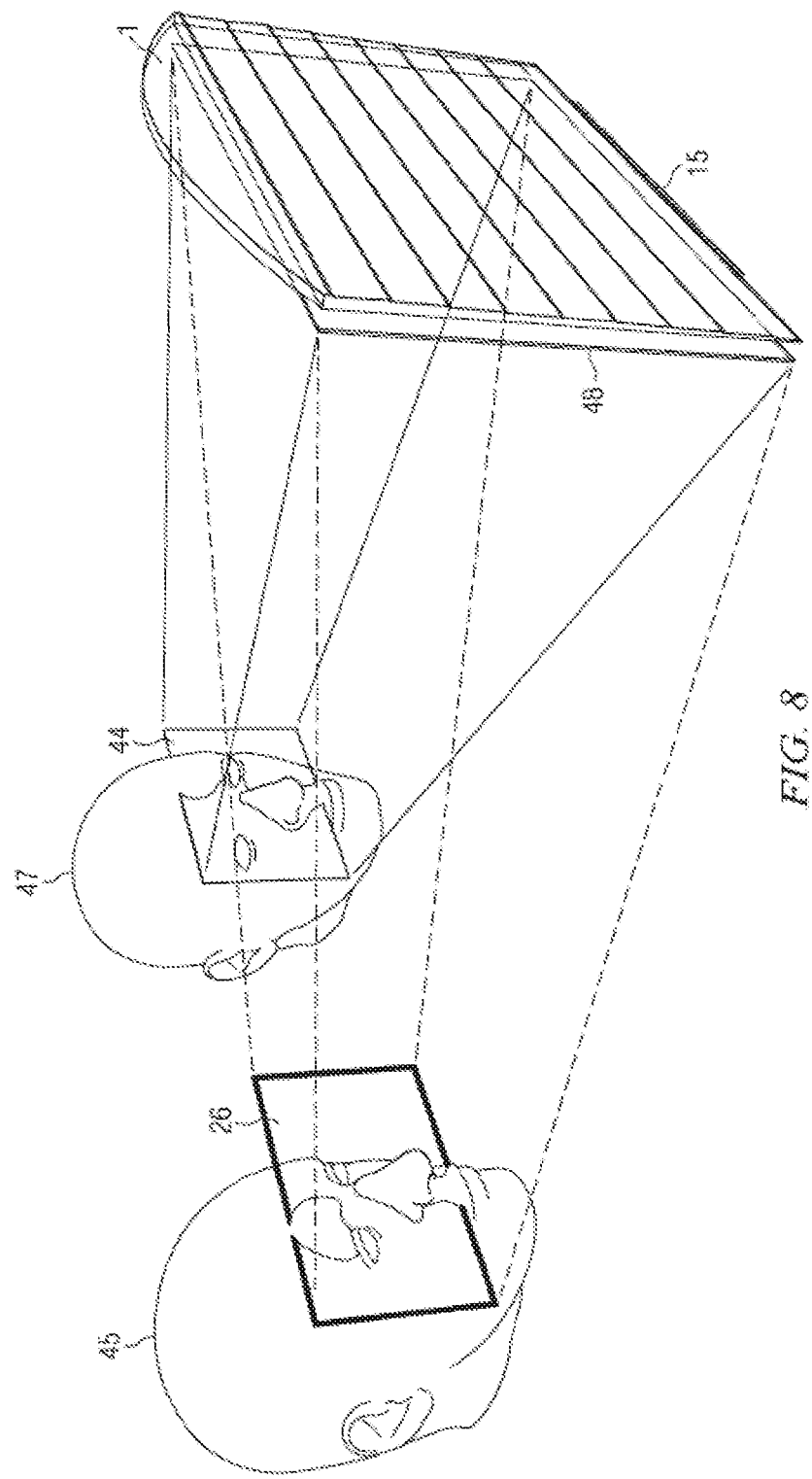
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in viewing window 26 will perceive a first image while an observer with both eyes in viewing window 44 will perceive a second image.

Figure 9:
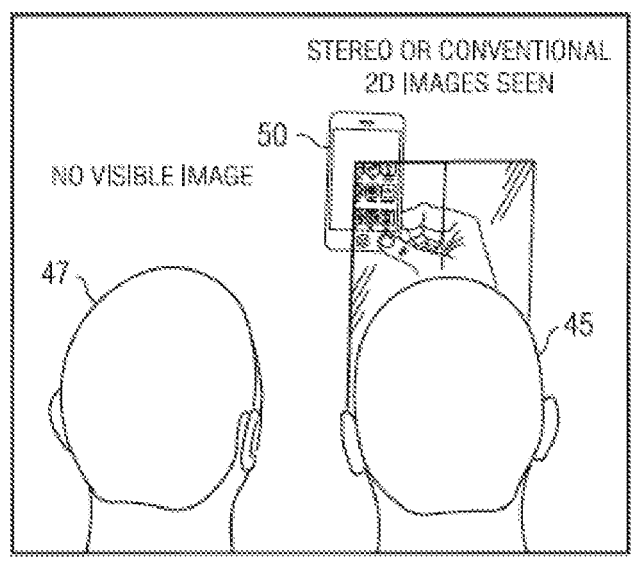
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
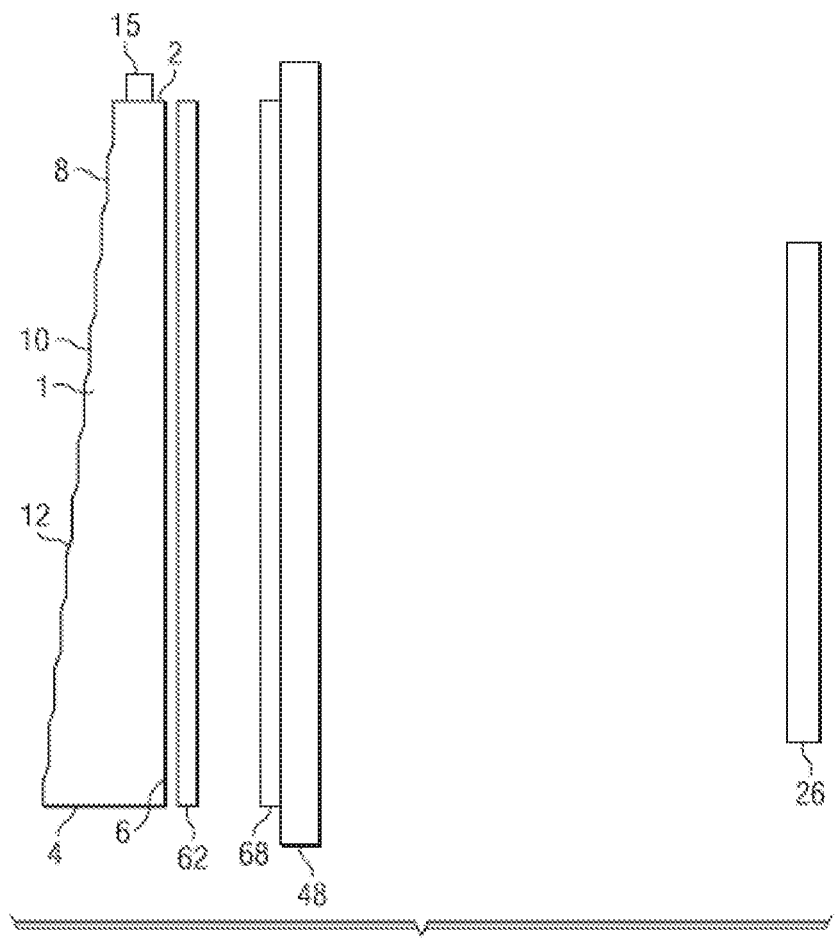
FIG. 10 is a schematic diagram illustrating in side view, the structure of a directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 for a substantially collimated output across the stepped waveguide 1 output surface. A vertical diffuser 68 may be arranged to extend the height of the viewing window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

Figure 11A:
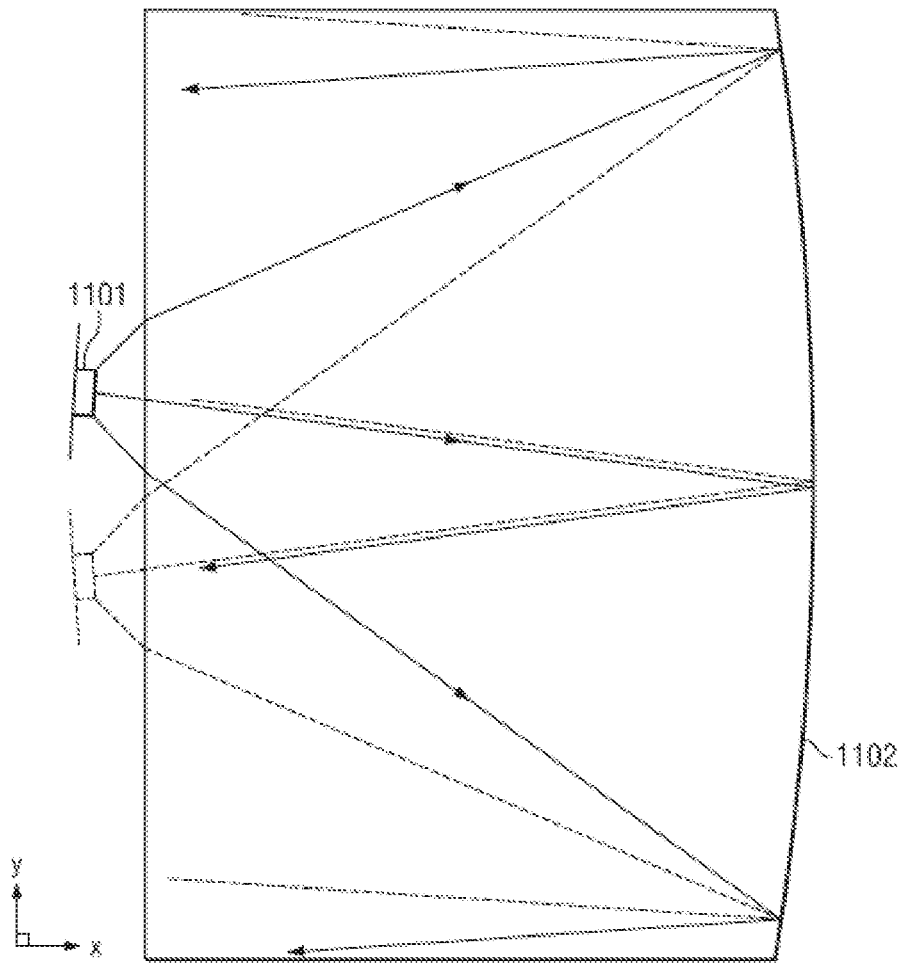
FIG. 11A is a schematic diagram illustrating a front view of a wedge type directional backlight, in accordance with the present disclosure.
Figure 11B:
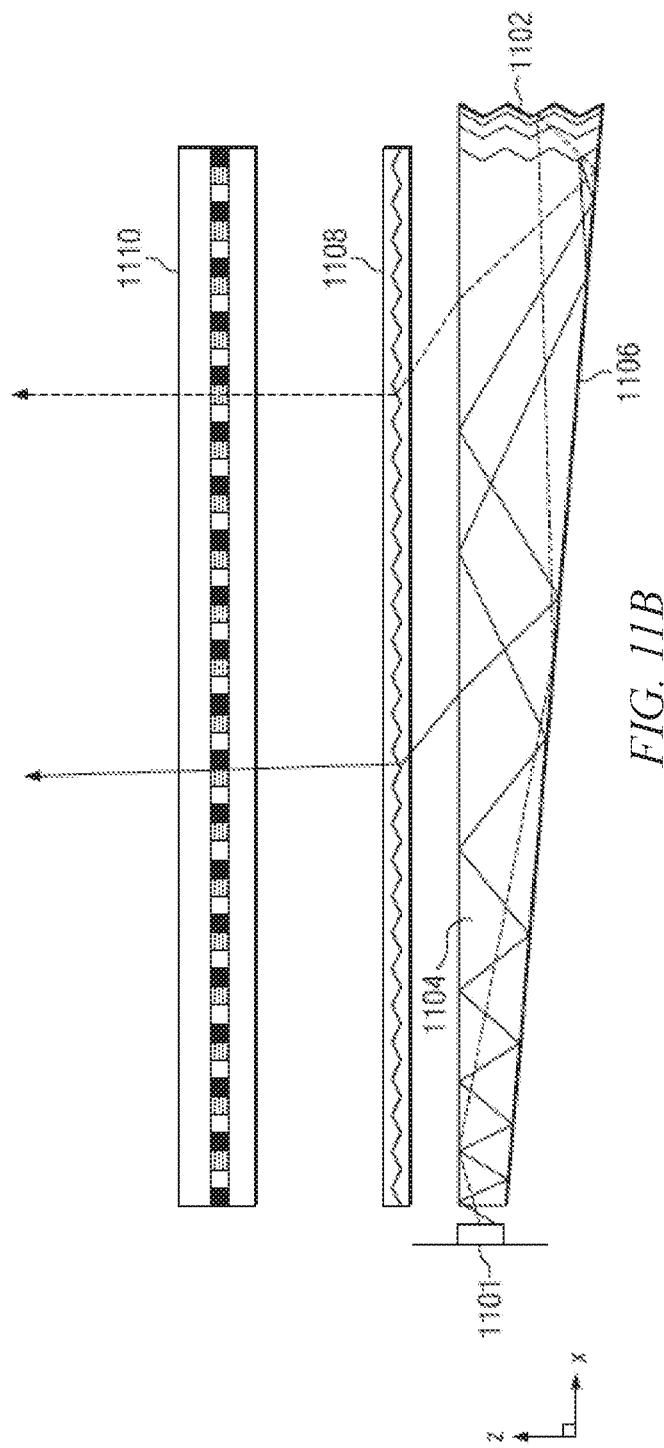
FIG. 11B is a schematic diagram illustrating a side view of a wedge type directional display device, in accordance with the present disclosure.

FIG. 11A is a schematic diagram illustrating a front view of another imaging directional backlight, as illustrated, a wedge type directional backlight, and FIG. 11B is a schematic diagram illustrating a side view of the same wedge type directional display device. A wedge type directional backlight is generally discussed by U.S. Pat. No. 7,660,047 and entitled "Flat Panel Lens," which is herein incorporated by reference in its entirety. The structure may include a wedge type waveguide 1104 with a bottom surface which may be preferentially coated with a reflecting layer 1106 and with an end corrugated surface 1102, which may also be preferentially coated with a reflecting layer 1106.

In one embodiment of FIG. 11B, a directional display device may include a waveguide, such as a wedge type waveguide 1104, having an input end, first and second opposed guide surfaces for guiding light along the waveguide, and a reflective end facing the input end for reflecting light from the input light back through the waveguide. The directional display device may also include an array of light sources disposed at different input positions across the input end of the waveguide. The waveguide may be arranged to direct input light from the light sources as output light through the first guide surface after reflection from the reflective end into optical windows in output directions relative to the normal to the first guide surface and may be primarily dependent on the input positions. The directional display device may also include a transmissive spatial light modulator, such as display panel 1110, arranged to receive the output light from the first guide surface and arranged to modulate a first polarization component of the output light having a first polarization. Further, the directional display device may also include a reflective polarizer disposed between the first guide surface of the waveguide and the spatial light modulator and arranged to transmit the first polarization component and to reflect a second polarization component of the output light having a polarization orthogonal to the first polarization as rejected light. The directional display device may also include a rear reflector disposed behind the second guide surface arranged to reflect the rejected light for supply back to the spatial light modulator. The directional display device may further be arranged to convert the polarization of the rejected light supplied back to spatial light modulator into the first polarization.

In one embodiment of a wedge type directional backlight, the first guide surface may be arranged to guide light by total internal reflection and the second guide surface may be substantially planar and inclined at an angle to reflect light in directions that break the total internal reflection for outputting light through the first guide surface. The wedge type directional backlight may be part of a directional display device. The directional display device may also include a deflection element extending across the first guide surface of the waveguide for deflecting light towards the normal to the spatial light modulator.

As shown in FIG. 11B, light may enter the wedge type waveguide 1104 from local sources 1101 and the light may propagate in a first direction before reflecting off the end surface. Light may exit the wedge type waveguide 1104 while on its return path and may illuminate a display panel 1110. By way of comparison with an optical valve, a wedge type waveguide provides extraction by a taper that reduces the incidence angle of propagating light so that when the light is incident at the critical angle on an output surface, it may escape. Escaping light at the critical angle in the wedge type waveguide propagates substantially parallel to the surface until deflected by a redirection layer 1108 such as a prism array. Errors or dust on the wedge type waveguide output surface may change the critical angle, creating stray light and uniformity errors. Further, an imaging directional backlight that uses a mirror to fold the beam path in the wedge type directional backlight may employ a faceted mirror that biases the light cone directions in the wedge type waveguide. Such faceted mirrors are generally complex to fabricate and may result in illumination uniformity errors as well as stray light.

The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

Figure 12:
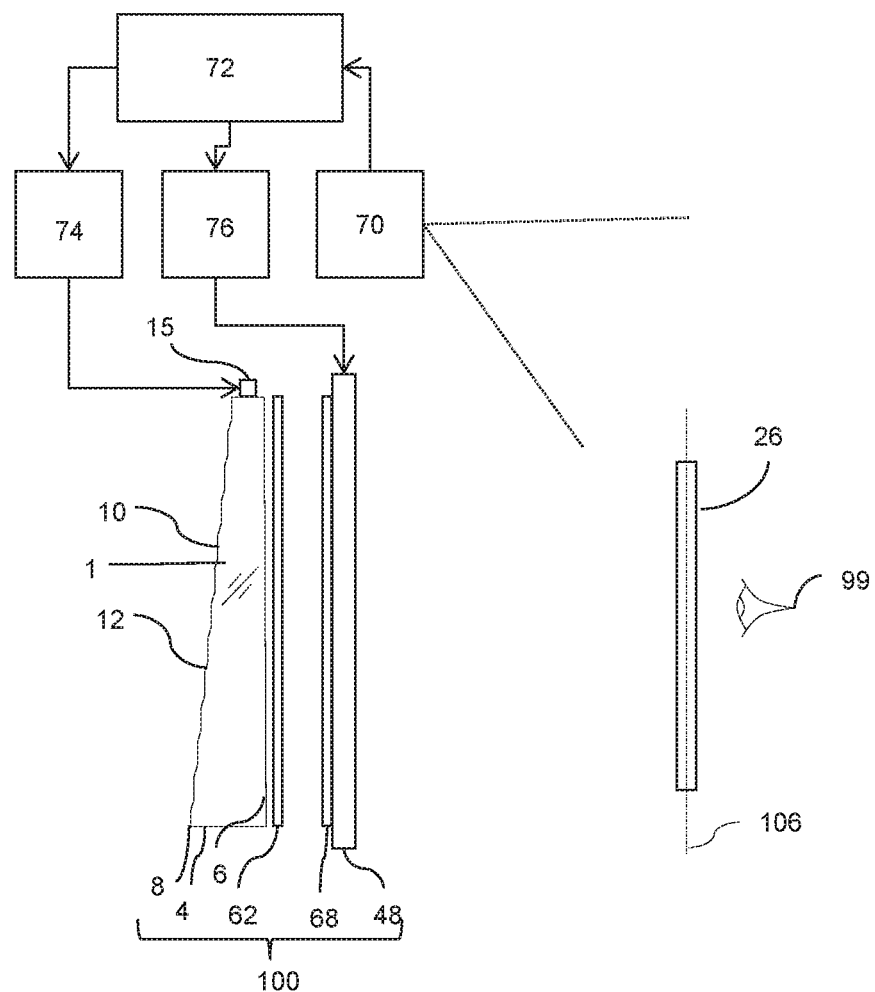
FIG. 12 is a schematic diagram illustrating control system for an observer tracking directional backlight apparatus, in accordance with the present disclosure.

FIG. 12 is a schematic diagram illustrating a directional display apparatus including a display device 100 and a control system. The arrangement and operation of the control system will now be described and may be applied, with changes as necessary, to each of the display devices disclosed herein.

The directional display device 100 includes a directional backlight that includes waveguide 1 and an array of illuminator elements 15 arranged as described above. The control system is arranged to selectively operate the illumination elements 15a-15n to direct light into selectable viewing windows.

The waveguide 1 is arranged as described above. The reflective end 4 converges the reflected light. A Fresnel lens 62 may be arranged to cooperate with reflective end 4 to achieve viewing windows 26 at a viewing plane 106 observed by an observer 99. A transmissive spatial light modulator (SLM) 48 may be arranged to receive the light from the directional backlight. Further a diffuser 68 may be provided to substantially remove Moire beating between the waveguide 1 and pixels of the SLM 48 as well as the Fresnel lens 62.

The control system may include a sensor system arranged to detect the position of the observer 99 relative to the display device 100. The sensor system includes a position sensor 70, such as a camera, and a head position measurement system 72 that may for example include a computer vision image processing system. The control system may further include an illumination controller 74 and an image controller 76 that are both supplied with the detected position of the observer supplied from the head position measurement system 72.

The illumination controller 74 selectively operates the illuminator elements 15 to direct light to into the viewing windows 26 in cooperation with waveguide 1. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 76 controls the SLM 48 to display images. To provide an autosterescopic display, the image controller 76 and the illumination controller 74 may operate as follows. The image controller 76 controls the SLM 48 to display temporally multiplexed left and right eye images. The illumination controller 74 operate the light sources 15 to direct light into viewing windows in positions corresponding to the left and right eyes of an observer synchronously with the display of left and right eye images. In this manner, an autostereoscopic effect is achieved using a time division multiplexing technique.

As illustrated in FIG. 12, a directional backlight device may include a stepped waveguide 1 and a light source illuminator array 15. As illustrated in FIG. 12, the stepped waveguide 1 includes a light directing side 8, a reflective side 4, guiding features 10 and light extraction features 12.

The above descriptions may apply to each or all of the following apparatuses, modifications and/or additional features, individually, or any combination thereof, which will now be described.

In another embodiment, a directional display device may further include a control system which may be arranged to selectively operate the light sources to direct light into viewing windows corresponding to output directions as previously discussed. This embodiment may also be used in conjunction with any of the directional backlights, directional display devices, directional display apparatuses, and so forth as described herein.

In another embodiment, a directional display apparatus may be an autostereoscopic display apparatus with a control system. The control system may be further arranged to control the directional display device to temporally display multiplexed left and right images and to substantially synchronously direct the displayed images into viewing windows in positions corresponding to at least the left and right eyes of an observer. The control system may include a sensor system which may be arranged to detect the position of an observer across the display device, and also may be arranged to direct the displayed images into viewing windows in positions corresponding to at least the left and right eyes of an observer. The position of the viewing windows may primarily depend on the detected position of the observer.

Figure 13A:
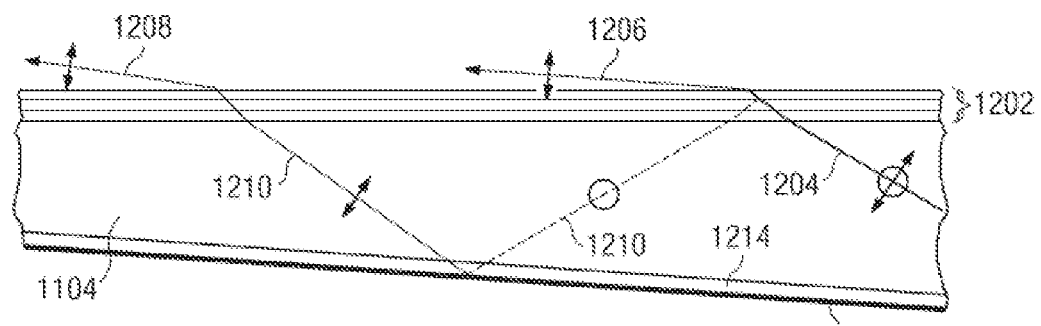
FIG. 13A is a schematic diagram illustrating a polarization recovery approach employed with a wedge type waveguide structure, in accordance with the present disclosure.

A polarization recovery approach based on the wedge type directional backlight system of FIGS. 11A and 11B is generally discussed in U.S. patent application Ser. No. 13/470,291, which is herein incorporated by reference in its entirety, and is illustrated schematically in FIG. 13A. FIG. 13A is a schematic diagram illustrating a polarization recovery approach employed with a wedge type waveguide structure employing a wedge type waveguide 1104 having the arrangement shown and described with reference to FIG. 11B.

As illustrated in FIG. 13A, the top surface of the waveguide of a wedge type directional backlight 1104 may be coated with layers 1202 of alternating high and low refractive index materials to provide polarization selective reflection and transmission for those rays 1206 and 1208 that exit. The layers 1202 formed on the first guide surface of the waveguide may form a reflective polarizer by (1) transmitting a first polarization component of the output light from the first guide surface of the waveguide, the first polarization component having a first polarization, and (2) reflecting a second polarization component of the output light as rejected light, the second polarization component having a polarization orthogonal to the first polarization. The narrow range of angles with which light exits this wedge type directional backlight may enable high polarization selectivity with very few coating layers 1202.

A rear reflecting layer 1212 that functions as a rear reflector is formed on the second guide surface of the waveguide. A retarder film 1214 laminated to the bottom of the waveguide or the second guide surface of the waveguide, may transform the polarization of reflected light to exit following reflection from the reflecting layer 1212. Unpolarised light ray 1204 is incident on layers 1202 so that ray 1206 is output with a first polarization state and ray 1210 is reflected with a second polarization state orthogonal to the first polarization state, rotated by layer 1212 and output as ray 1208 in the first polarization state.

Continuing the discussion of FIG. 13A, the retarder film 1214 functions as a phase retarder and may be disposed between the reflective polarizer formed by the layers 1202 and the rear reflector formed by the reflecting layer 212. The retarder film 1214 may be arranged to convert the polarization of the rejected light into the first polarization when the light exits the wedge type waveguide 1104 for supply back to a spatial light modulator.

Figure 13B:
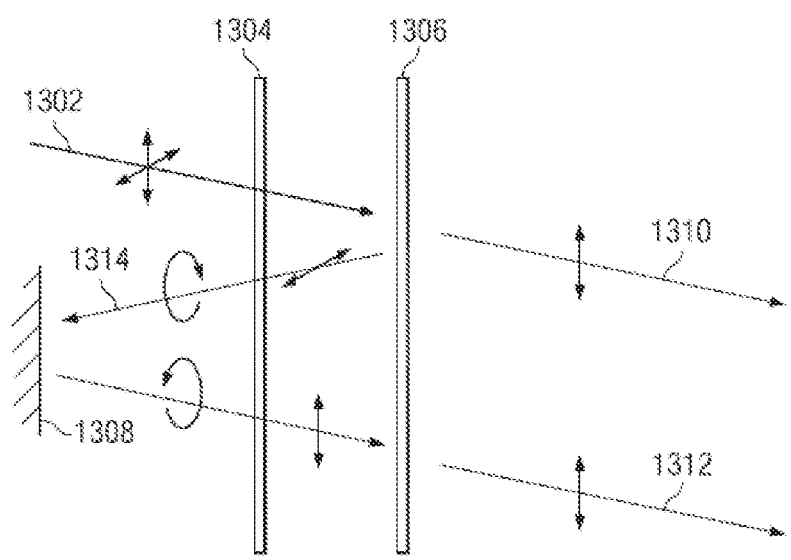
FIG. 13B is a schematic diagram illustrating the elements of a polarization recovery system, in accordance with the present disclosure.

FIG. 13B is a schematic diagram illustrating the elements of a polarization recovery system. Further, FIG. 13B illustrates a general embodiment of the current disclosure. Imaging directional backlight systems may illuminate with unpolarized light 1302 to provide polarized light for LCDs a polarizing sheet may be used which may absorb at least 50% of the illuminating light. Recovery of this absorbed light may be possible by introducing a reflecting polarizer layer 1306 which functions as a reflective polarizer. The reflecting polarizer layer 1306, while allowing transmission of light of the desired first polarization component 1310 of a first polarization, may reflect the otherwise lost second polarization component 1314 having a polarization orthogonal to the first polarization, as rejected light. This reflected component then can be altered in polarization most efficiently by a quarter wave retarder 1304 oriented at approximately 45° to the polarization axis of the light that functions as a phase retarder. Redirection of the light through reflection off of mirror 1308 may cause the light to complete a second pass through the quarter wave retarder 1304, thus substantially completing the polarization transformation and allowing efficient transmission through the reflecting polarizer 1306 as well as making the light 1312 propagate approximately parallel to the light originally transmitted 1310. In an ideal case little to no light may be lost and the directionality of the combined illumination may be substantially preserved. The polarization conversion and redirection of the reflected component can be achieved by other means such as scattering which may be a property of the underlying backlight illuminator. To achieve some measure of polarization recovery therefore may employ a minimum of a reflecting polarization element.

Distinct from the previous disclosed approach of U.S. patent application Ser. No. 13/470,291, the embodiments of the current disclosure may not rely on reflection of a narrow band, approximately less than 2° of polarized exiting rays and may employ a reflecting polarizer capable of acting on rays at angles with a spread up to and beyond approximately 450 of display viewing angles.

Figure 14A:
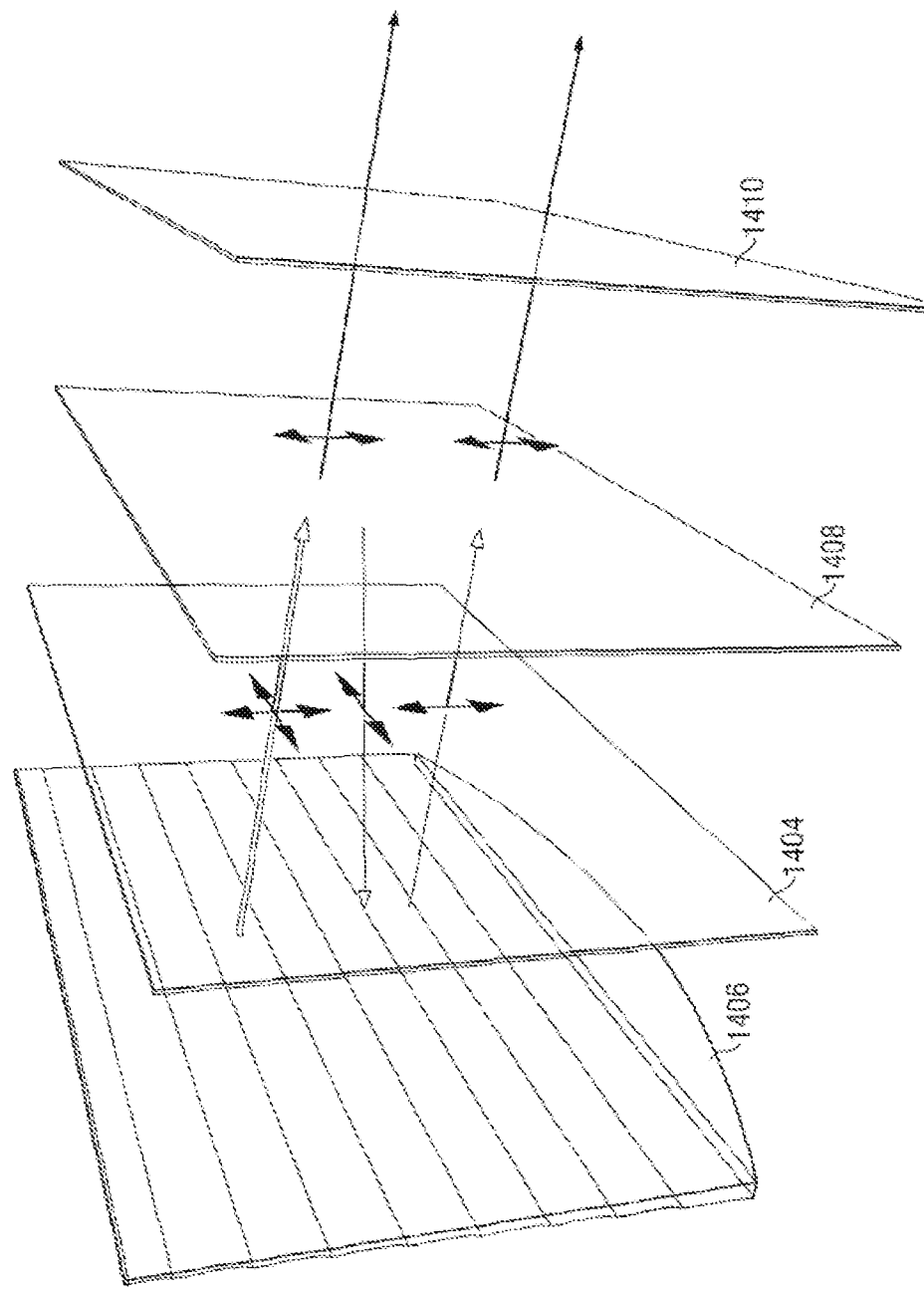
FIG. 14A is a schematic diagram illustrating a directional backlight employing a polarization recovery approach, in accordance with the present disclosure.
Figure 14B:
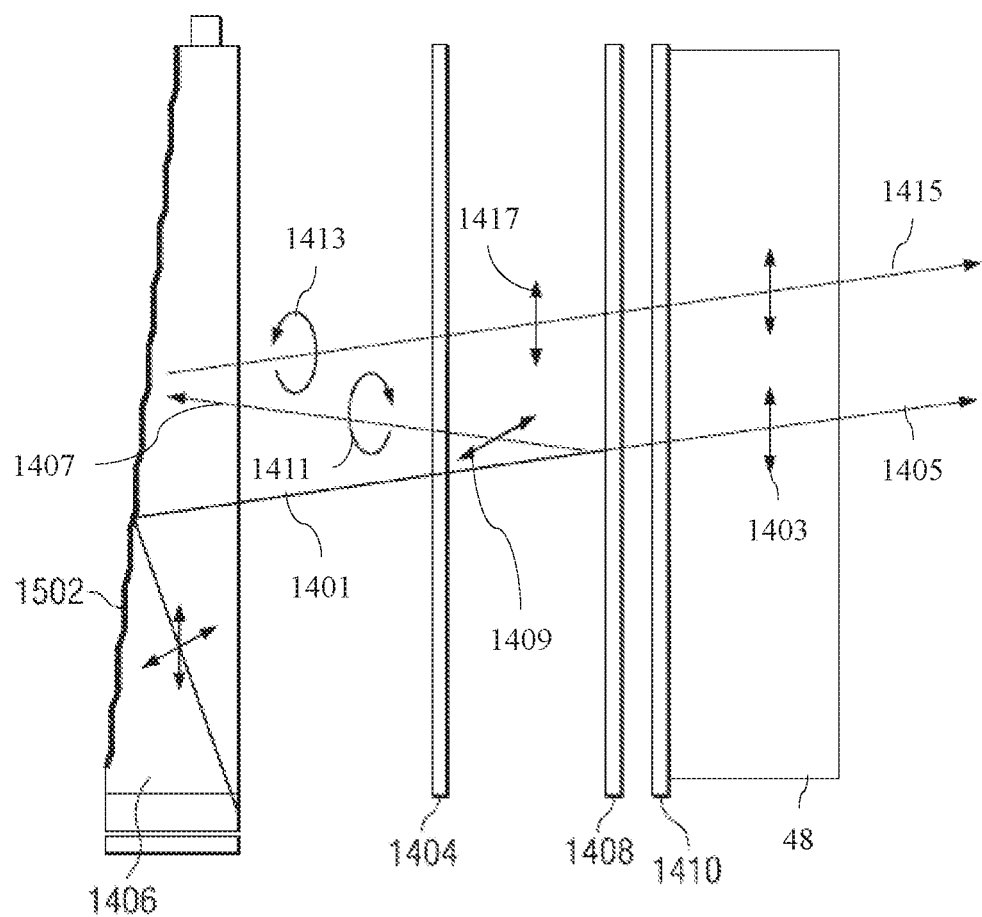
FIG. 14B is a schematic diagram illustrating a side view of the directional backlight of FIG. 14A, in accordance with the present disclosure.

FIG. 14A is a schematic diagram illustrating a directional backlight employing a polarization recovery approach, and FIG. 14B is a schematic diagram illustrating a system side view of the directional backlight of FIG. 14A. Further, FIG. 14A shows an embodiment of a waveguide structure of the directional backlight with its side view shown in FIG. 14B, arranged as follows. A stepped waveguide 1406 may have the stepped surface 1502 (first guide surface) coated with a reflecting material such as, but not limited to, Silver or Aluminum to form the rear reflector.

Light rays 1401 propagating within the valve 1406 and reflected from light extraction features of the surface 1502 may be substantially unpolarised. After transmission through a phase retarder such as a quarter wave retarder 1404, the light remains unpolarised. Light rays 1405 of the desired vertical polarization state 1403 are transmitted through reflective polarizer 1408 and clean-up sheet polarizer 1410 with a vertical polarization transmission orientation for transmission through spatial light modulator 48. Such rays 1405 may be transmitted through the spatial light modulator with substantially no change to the directionality of the light.

In this embodiment, a reflective polarizer 1408 is arranged in front of the stepped waveguide 1406 and a quarter wave retarder 1404 that functions as a phase retarder may be disposed between the stepped waveguide 1406 and the reflective polarizer 1408, and thus between the rear reflector formed on the stepped surface 1502 and the reflective polarizer 1408.

Light rays 1407 of the undesired horizontal linear polarization state 1409 may exit the stepped waveguide 1406 and be reflected from the reflective polarizer 1408 as reflected light. Residual transmission of light in the horizontal polarization state 1409 by the reflective polarizer 1408 may be cleaned up by a sheet polarizer 1410 arranged in front of the reflective polarizer 1408.

The quarter wave retarder 1404 may be arranged to convert the polarization of the rejected light into the first polarization when supplied back to the spatial light modulator (not shown) that is arranged in front of the sheet polarizer 1410, as follows. Rejected rays 1407 with a horizontal polarization state may pass back through a quarter wave retarder 1404 with an optical axis oriented at approximately 45°, and thus be converted to circular polarization state 1411. The respective reflected light may then be transmitted through the transparent optical valve 1406 before being further reflected from the back stepped surface 1502 of the waveguide 1406. The circular polarization state 1411 of light rays 1407 may be converted on reflection to orthogonal circular polarization state 1413 and become predominantly transformed into the desired vertical polarization state 1417 following a second pass through quarter wave retarder 1404 achieving transmission through reflective polarizer 1408 and clean up polarizer 1410. The rays 1415 may then combine with those rays 1405 originally transmitted by polariser 1410 to form a substantially uniformly polarized directed beam of effectively substantially twice the original intensity and with the substantially the same directionality. Thus the intensity of viewing windows may be increased with low image cross talk. Small loss of intensity of light rays 1415 may be provided by reduced reflectivity at the side 1502 and other additional losses from Fresnel reflections of the reflected rays 1407. The quarter wave retarder 1404 may be a single layer retarder with a single optical axis direction. Alternatively retarder layer stacks with increased number of layers and combination of retardances and optical axis directions may be arranged to increase the spectral bandwidth of the retarder as is known. The optical axes of the respective retarders of the stack of retarders may thus be arranged to convert light from linear to circular polarization states as required. The polarization state 1403, 1417 may be arranged to be aligned with the desired input polarization direction of polarizer 1410 and may be at +/−45° for twisted nematic liquid crystal modes, or may be vertical or horizontal for other known optical modes such as vertical alignment modes.

To maintain the directional fidelity of the original beam, the reflective polarizer 1408 may be approximately parallel with respect to the reflecting surface 1502 and may for example be arranged on the input to the spatial light modulator 48 to provide a substantially planar surface. This can be achieved with a flexible film attached for example by means of lamination onto the clean-up polarizer film adjacent, or directly onto the panel. The clean-up polarizer may typically include an absorption polarizer such as iodine and stretched film. This can be achieved with a flexible film attached with the clean-up polarizer film adjacent, or directly onto the panel.

As discussed herein, a suitable reflective polarizer may be the multi-layer birefringent film for example, a product DBEF supplied by 3M. Another candidate may be a periodic metal wire grid structure on glass with periodicity below the wavelength of visible light such as that supplied by Moxtek. Further, the reflective polarizer as discussed herein may be a similar metal grid structure may be provided on film stock by Asai Kasei.

Efficient polarization transformation may be achieved when the material of the stepped waveguide 1406 exhibits little to no birefringence. The case in which birefringence is oriented along the vertical or horizontal directions as primarily determined by the physical structure of the waveguide, the birefringence may then be compensated by an extra retarder film or more preferably subtracted from a substantially parallel aligned quarter wave retarder. In this last case the film orientations may be preferably oriented with an optical axis at approximately 45 degrees to the orientation shown in FIGS. 14A and 14B.

Any additional optical elements such as asymmetric diffusers or Fresnel lenses may be located between the reflective polarizer 1408 and the sheet polarizer 1410.

In cases in which the reflective polarizer 1408 may cause asymmetric scattering, the orientation of the greatest scattering may be vertical as illustrated by FIG. 14B. Optical valves in a basic form may act to image in the horizontal plane and may be tolerant to vertical scattering.

Figure 15A:
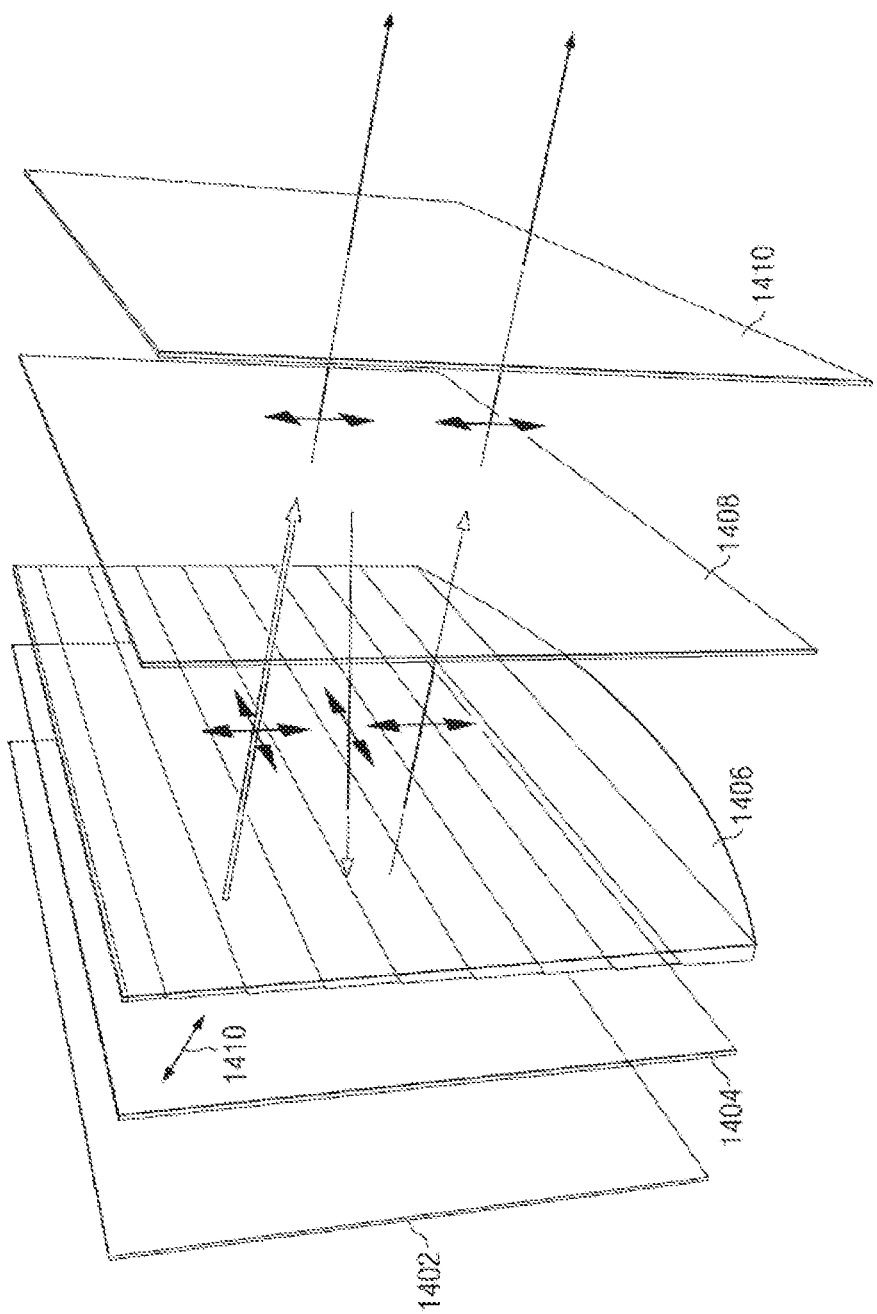
FIG. 15A is a schematic diagram illustrating another system schematic of a directional backlight employing a polarization recovery approach, in accordance with the present disclosure.
Figure 15B:
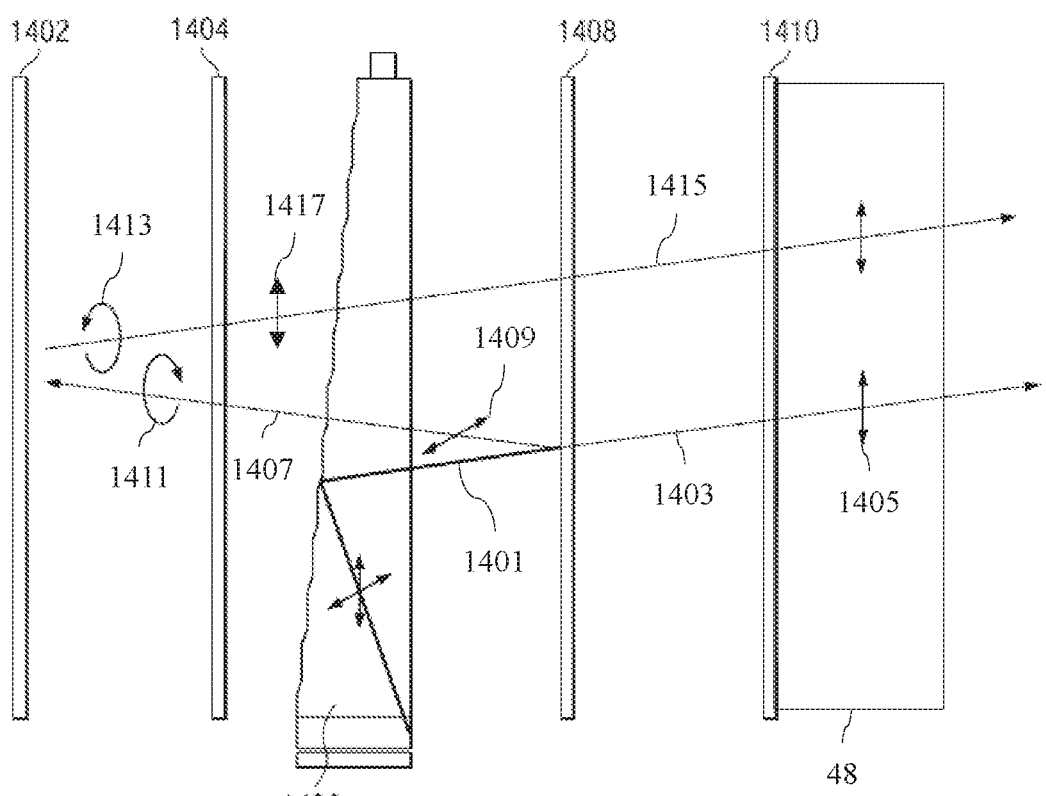
FIG. 15B is a schematic diagram illustrating a system side view illustration of the directional backlight of FIG. 15A, in accordance with the present disclosure.

FIG. 15A is a schematic diagram illustrating another system schematic of a directional backlight employing a polarization recovery approach based on a waveguide, and FIG. 15B is a schematic diagram illustrating a system side view illustration of the directional backlight of FIG. 15A. Further, FIGS. 15A and 15B show an additional embodiment of the current disclosure.

Related to the embodiment of FIGS. 14A and 14B, the waveguide structure of this directional backlight may employ a waveguide 1406, reflective polarizer 1408, and sheet polarizer 1410 as described above. Replacing a mirrored coating on the stepped surface 1502 (first guide surface) of the waveguide, there may be a separate reflector layer 1402 behind the waveguide 1406 that acts as the rear reflector, and the quarter wave retarder 1404 may be arranged behind the waveguide, in particular between the waveguide and the reflector layer 1402, as illustrated in FIGS. 15A and 15B. In one embodiment, the reflective polarizer may be layers of material of alternating high and low refractive index. Thus light rays 1415, 1405 may be achieved with substantially the same directionality and polarization state. This embodiment operates in the same manner as the embodiment of FIGS. 14A and 14B.

Not having to coat the stepped surface may reduce scattering and cost. Also in placing the retarder layer behind the waveguide, light with linear polarization states may be back reflected through the stepped waveguide providing tolerance to non-uniform, though parallel oriented, birefringence which may be expected in any molded parts. Advantageously, the most common direction of the optical axis of birefringence of the waveguide 1406 may be arranged to be parallel to or orthogonal to the polarization state 1417 to achieve reduced non uniformities of polarization conversion and thus reduced display non uniformities.

Figure 16A:
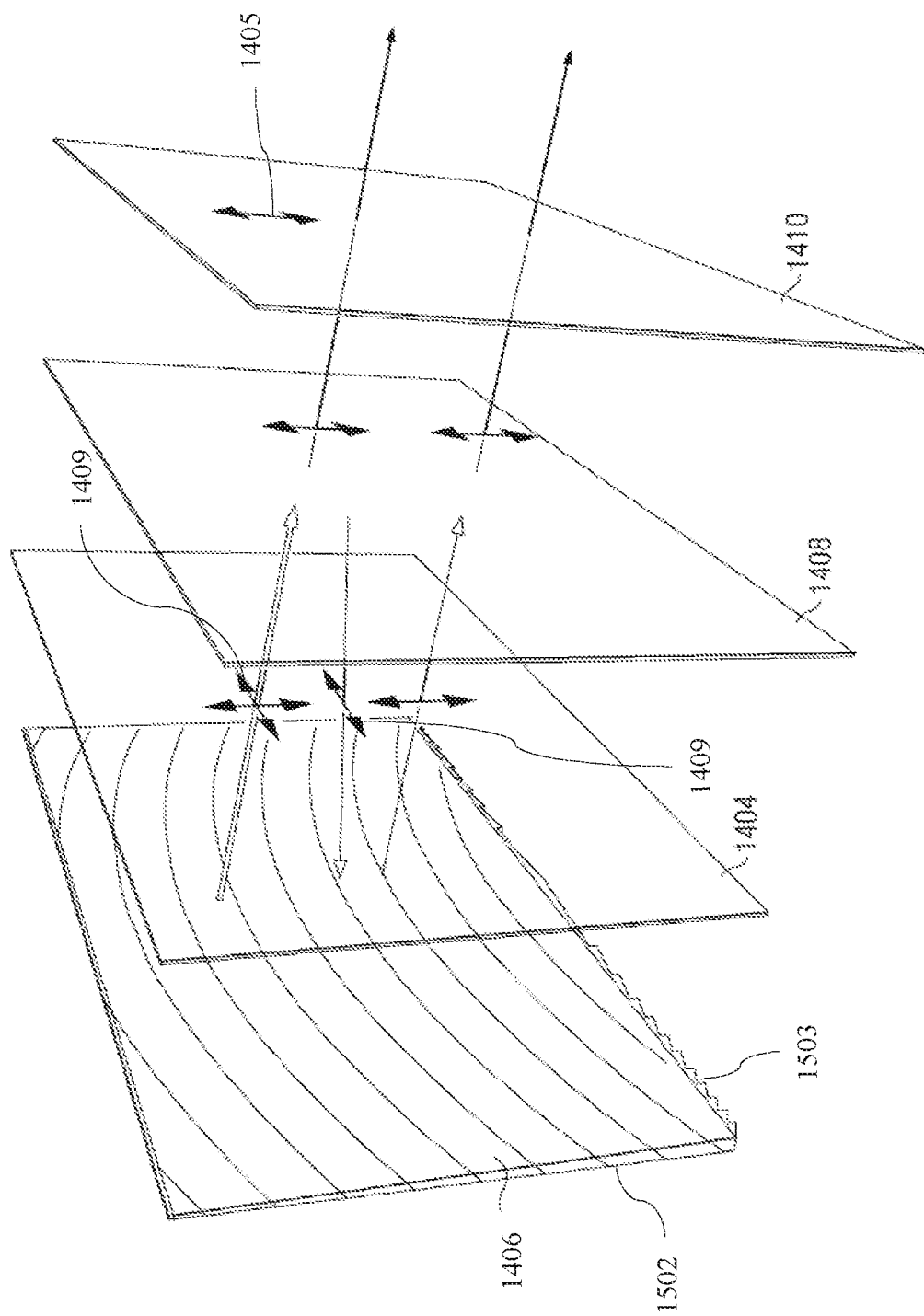
FIG. 16A is a schematic diagram illustrating another directional backlight employing a polarization recovery approach, in accordance with the present disclosure.

FIG. 16A is a schematic diagram illustrating another directional backlight employing a polarization recovery approach based on an alternative waveguide structure. Further, FIG. 16A is another embodiment in which an alternate waveguide structure may be employed. Similar to FIG. 14A, as illustrated, the waveguide structure of FIG. 16A includes a stepped waveguide 1406, a quarter wave retarder 1404, a reflective polarizer 1408, and a sheet polarizer 1410 arranged and operating in the same manner as the embodiment of FIG. 14A. In FIG. 16A, the curved reflector end of the stepped waveguide 1406 may be replaced by a Fresnel reflector equivalent structure, and curved extraction steps may render extraneous any further imaging element on the system such as Fresnel lens 62 shown in FIG. 12. The stepped surface 1502 of the waveguide 1406 may be directly coated with a reflecting coating to back reflect light for polarization recovery as described for previous embodiments.

Figure 16B:
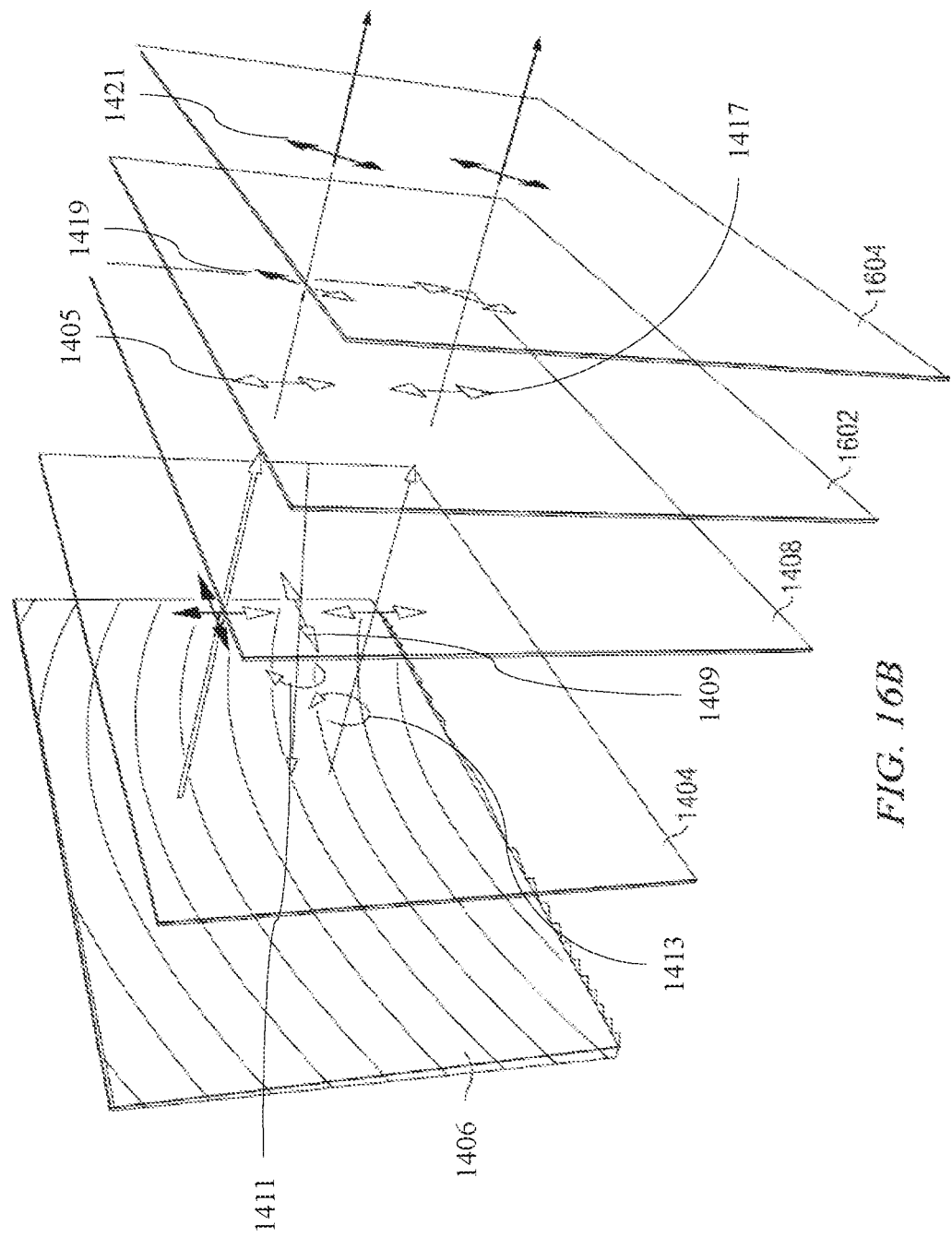
FIG. 16B is a schematic diagram illustrating yet another directional backlight employing a polarization recovery approach, in accordance with the present disclosure.

FIG. 16B is a schematic diagram illustrating yet another directional backlight employing polarization recovery approach based on another alternative waveguide structure. Further, FIG. 16B is a related system embodiment in which an additional polarization rotation film 1602 is disposed between the reflective polarizer 1408 and the spatial light modulator (not shown). The polarization rotation film 1602 acts as a polarization rotator that rotates the first polarization component output from the reflective polarizer 1408 prior to supply to the SLM. This may be used to transform the output linear polarization state 1405, 1417 to polarization state 1419 from retarder 1602 that may be a half wave retarder that may be a wide band retarder stack with appropriately oriented optical axes. After clean up by polariser 1604 polarisation state 1421 is oriented at approximately 45 degrees to the vertical for more optimum operation with twisted nematic (TN) liquid crystal display (LCD) panels. A substantially parallel 450 aligned clean-up polarizer sheet 1604 may be used in place of the sheet polarizer 1410 to provide highly polarized light at the appropriate orientation for high contrast operation.

As illustrated in FIG. 16B, a directional display device may include a stepped waveguide 1406, a quarter wave retarder 1404, a polarization sensitive layer 1408, and a sheet polarizer 1410. The directional display device may further include a polarization rotator disposed between the reflective polarizer and a spatial light modulator. The polarization rotator may be arranged to rotate the first polarization component.

Figure 17:
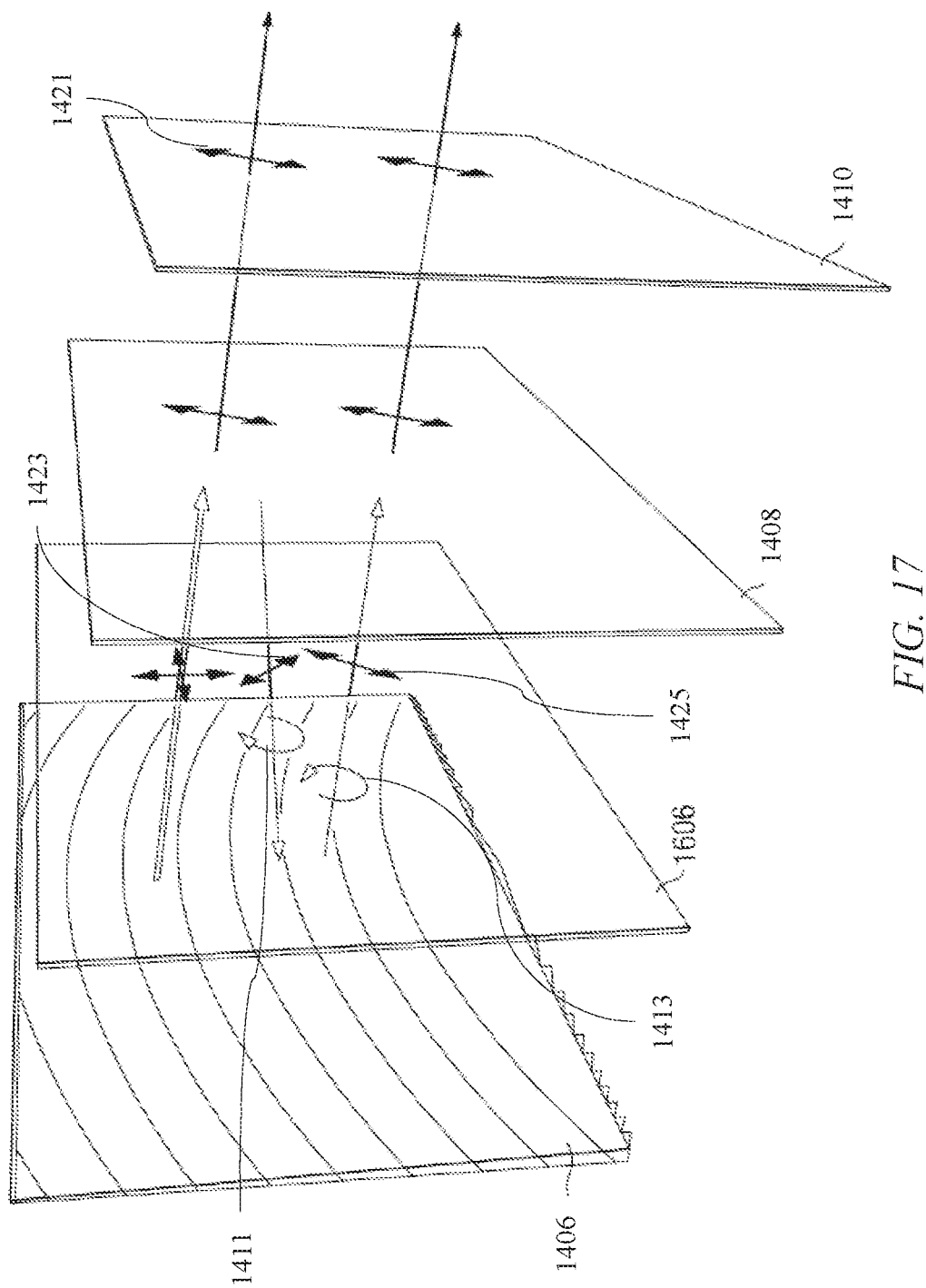
FIG. 17 is a schematic diagram illustrating yet another directional backlight employing an alternative waveguide structure in which approximately 45° oriented output polarization is provided, in accordance with the present disclosure.

FIG. 17 is a schematic diagram illustrating another directional backlight employing a polarization recovery approach modified as compared to the embodiment of FIG. 16B to provide an alternative optical valve structure in which approximately 45° oriented output polarization is provided. Further, FIG. 17 is yet another directional backlight employing a polarization recovery approach with film orientations rotated by approximately 45° for direct recovery of TN desired polarized light. Thus polarization states 1423, 1425 may be arranged at angles other than horizontal and vertical and retarder 1606 arranged to cooperate with the incident polarisation states to achieve polarisation rotation as described above. As described above, the orientation of quarter wave retarder 1606 may be substantially parallel to the physical sides of the optical valve and oriented with respect to any residual birefringence. Choosing a retardation value different to that of a quarter-wave may act to compensate for any residual waveguide birefringence.

Figure 18A:
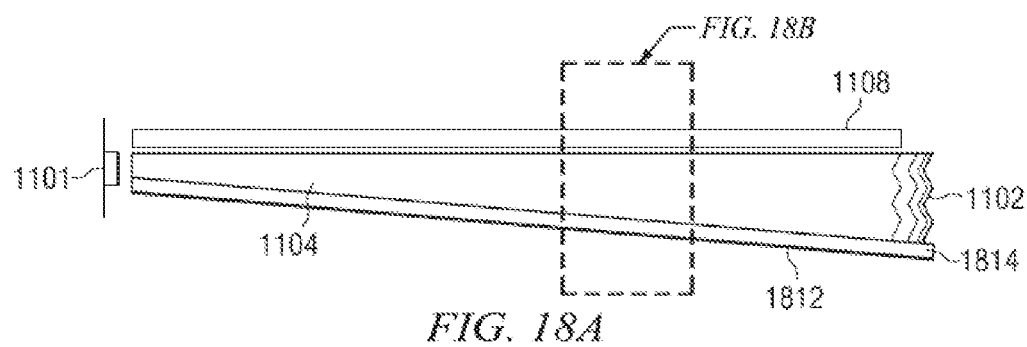
FIG. 18A is a schematic diagram illustrating an embodiment in which the polarizing reflecting layer is integrated in a single film with the beam deflecting function within a wedge type directional backlight system, in accordance with the present disclosure.
Figure 18B:
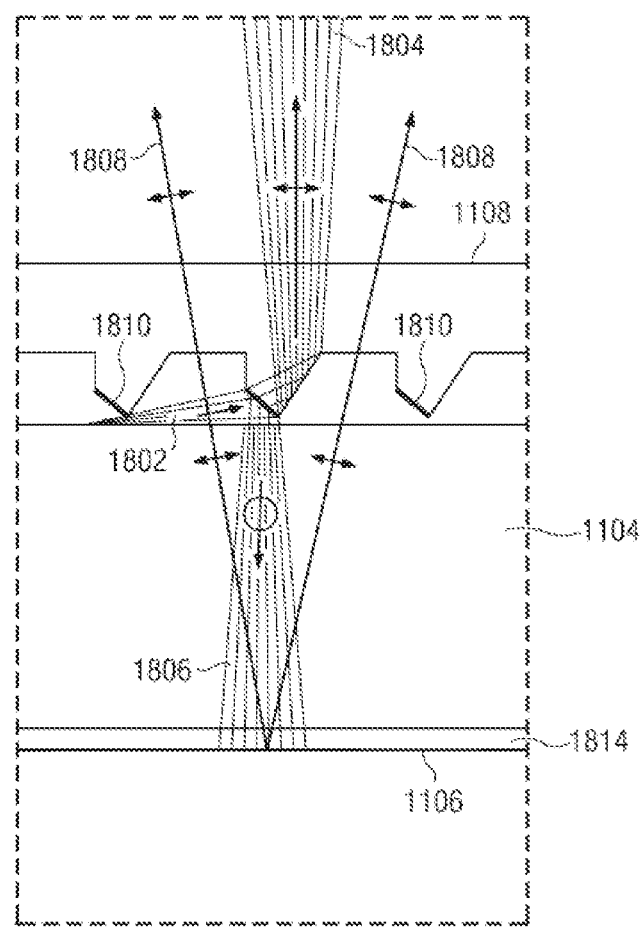
FIG. 18B is an enlarged cross sectional view of polarization recovery embodiment of FIG. 18A, in accordance with the present disclosure.

FIG. 18A is a schematic diagram illustrating an embodiment in which the polarizing reflecting layer is integrated in a single film with the beam deflecting function within a wedge type directional backlight with further detail illustrated in FIG. 18B. Further, FIGS. 18A and 18B illustrate an embodiment in which polarization recovery may be employed with a wedge type directional waveguide. A polarization sensitive reflector layer may be coated onto facets 1810 of a redirection film 1108. The wedge type directional backlight may operate in such a way as to provide an unpolarized, though directed, exiting beam 1802 that may propagate at small angles from the exiting surface. Light within this beam of the undesired polarization state may be reflected downwards off the polarization sensitive reflector layer on facets 1810 and away from the illumination direction. Light 1804 of the desired polarized state, by contrast, may be allowed to be transmitted and redirected upward. The downward propagating beam may pass through the transparent wedge guide material and may be both transformed and redirected back by the quarter wave retarder 1814 and reflecting surface 1106. This transformed light may pass back through the waveguide 1104 and redirection film 1108 to combine with the initial light beam of the desired polarization.

In one embodiment, a directional display device may include a waveguide in which a first guide surface may be arranged to guide light by total internal reflection and a second guide surface may include a plurality of light extraction features. The light extraction features may be oriented to reflect light guided through the waveguide in directions allowing exit through the first guide surface as the output light. The second guide surface may also include intermediate regions between the light extraction features that may be arranged to direct light through the waveguide without substantially extracting it. Additionally, the light extraction features may be facets of the second guide surface and the second guide surface may have a stepped shape that may include the reflective facets and the intermediate regions. This embodiment and description of a waveguide may be used in conjunction with any of the previously described embodiments that employ a directional display device and/or a waveguide.

Figure 18C:
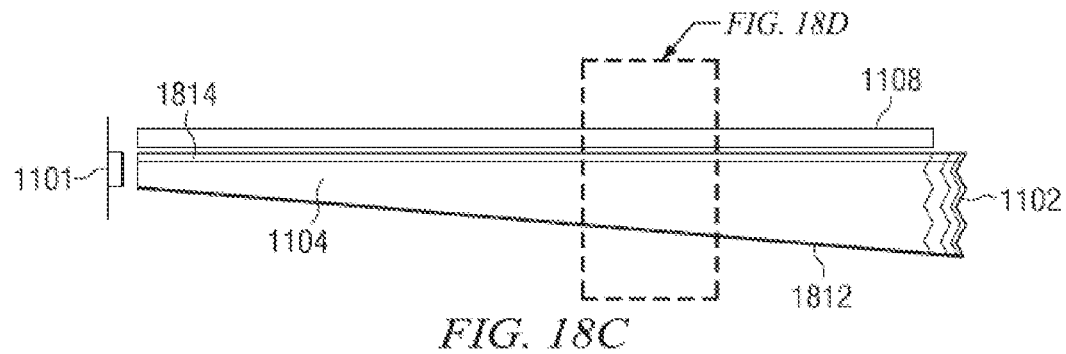
FIG. 18C is a schematic diagram illustrating another embodiment in which the polarizing reflecting layer is integrated in a single film with the beam deflecting function within a wedge type directional backlight system; in accordance with the present disclosure.
Figure 18D:
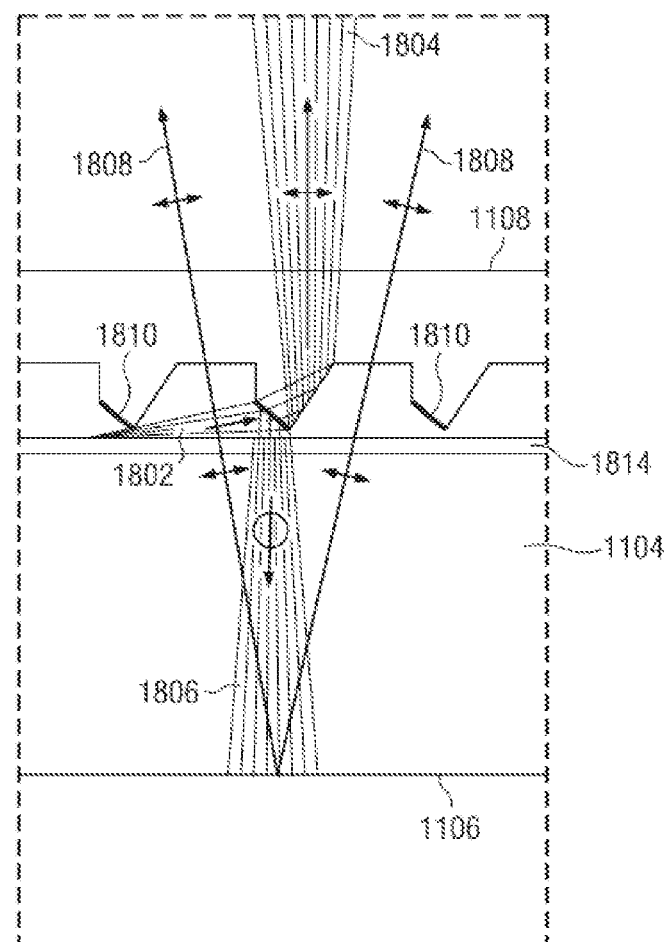
FIG. 18D is an enlarged cross sectional view of polarization recovery embodiment of FIG. 18C, in accordance with the present disclosure.

FIG. 18C is a schematic diagram illustrating another polarization recovery embodiment within a wedge type directional backlight with further detail shown in FIG. 18D. FIG. 18D is an enlarged cross sectional view of polarization recovery embodiment of FIG. 18C. Further, FIG. 18B illustrates a related embodiment to that of FIG. 18A in which the quarter wave retarder 1814 may be located on the exiting surface of the waveguide rather than between the waveguide and the reflection layer 1812.

Figure 19:
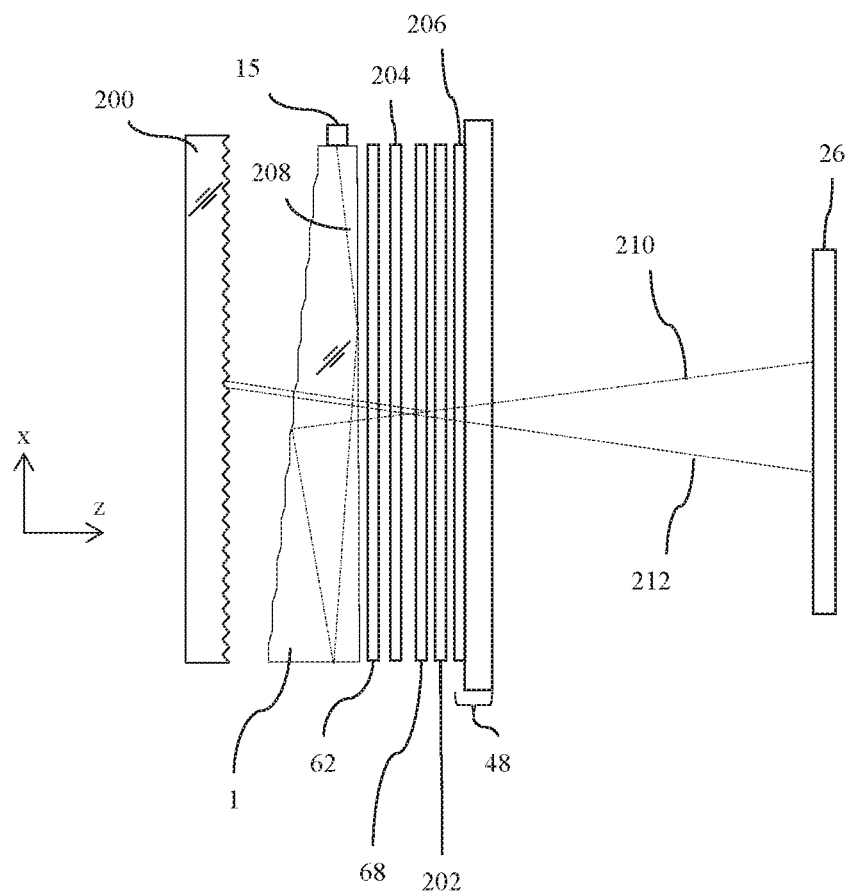
FIG. 19 is a schematic diagram illustrating a side view of a polarisation recovery embodiment, in accordance with the present disclosure.

FIG. 19 is a schematic diagram illustrating a side view of a polarization recovery embodiment. The embodiment is generally similar to that shown in FIG. 15A and described above but modified so that instead of providing the quarter wave retarder 1404, the rear reflector is arranged to convert the polarization of the rejected light into the first polarization when supplied back to the spatial light modulator.

In this embodiment, a directional display device includes a waveguide 1 and illuminator array 15, as well as an SLM 48 which receives the output light from the waveguide 1, being arranged as described above. The display device may further include the following components in series between the waveguide 1 and an SLM 48, Fresnel lens 62, optional phase retarder such as a half wave retarder 204, asymmetric diffuser 68, reflective polarizer 202, and clean up polarizer 206 at the input to the spatial light modulator 48. A prismatic reflective film 200 is disposed behind the second guide surface of the SLM 48 and functions as a rear reflector.

Due to the reflective polarizer 202 that is arranged between the first guide surface of the waveguide 1 and the SLM 48 being arranged to transmit the first polarization component, unpolarized light rays 208 propagating in optical valve 1 are directed as light rays 210 to viewing window 26 in the same manner as the embodiments described above with the first polarization that is transmitted through reflective polarizer 202 and clean up polarizer 206. Light rays 210 of the second polarization component having a polarization orthogonal to the first polarization are reflected by the reflective polarizer 202 as rejected light and are transmitted through the waveguide 1 to prismatic reflective film 200 whereon they are reflected and directed as light rays 212 back to the SLM 48. The vertical position of the light ray 212 at window 216 may thus be different to the position of light ray 210. However, such light rays may include the same optical window directionality in a lateral (y-axis) direction.

The prismatic reflective film 200 converts the polarization of the rejected light into the first polarization as will be described below.

Figure 20:
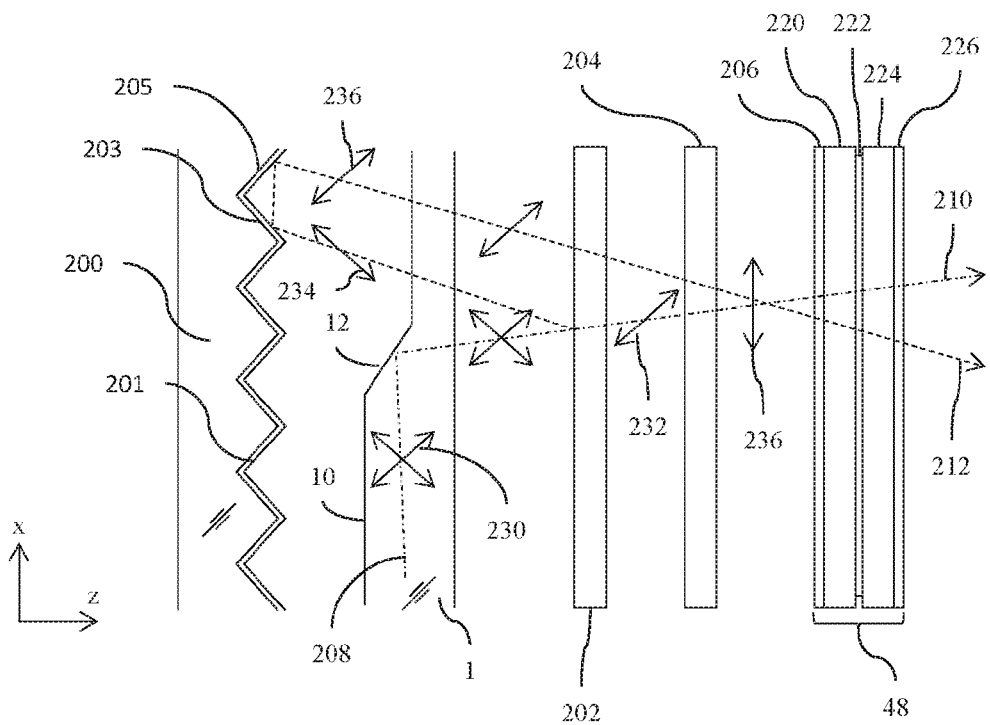
FIG. 20 is a schematic diagram illustrating a side view of a detail of the polarisation recovery embodiment of FIG. 19, in accordance with the present disclosure.
Figure 21:
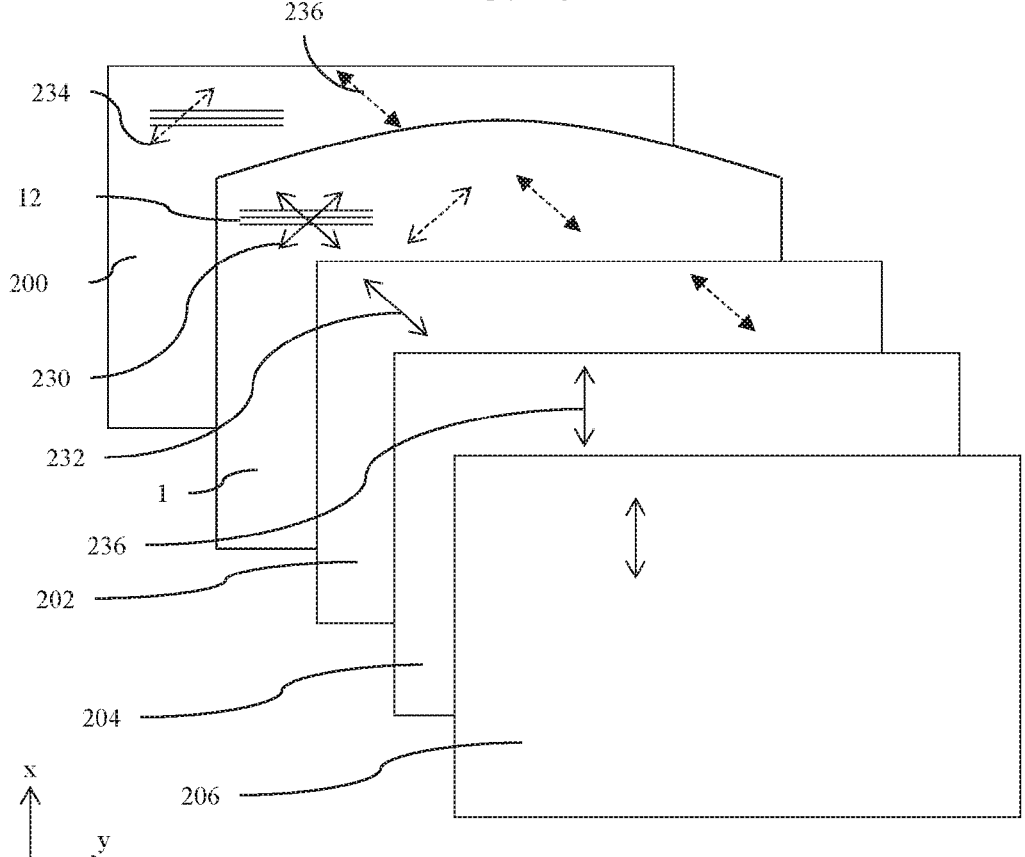
FIG. 21 is a schematic diagram illustrating a schematic front view of the polarisation recovery embodiment of FIG. 19, in accordance with the present disclosure.

FIG. 20 is a schematic diagram illustrating a side view of a detail of the polarization recovery embodiment of FIG. 19 and FIG. 21 is a schematic diagram illustrating a schematic front view of the polarization recovery embodiment of FIG. 19. For clarification purposes, Fresnel lens 62 and diffuser 68 are not shown.

Light rays 208 propagating in the waveguide of optical valve 1 include unpolarized light state 230. Light rays reflected from light extraction features 12 are substantially unpolarized and incident on reflective polarizer 202 as described above. Transmitted rays 210 of the first polarization component are directed through an optional retarder 204 which may be a half wave retarder with appropriately oriented optical axis arranged to direct the first polarization component state 236 on to the transmission axis of clean up polariser 206 of the spatial light modulator 48.

Spatial light modulator 48 may further include substrates 220, 224 such as glass substrates, liquid crystal layer 222 and output polariser 226.

Light rays 212 reflected by reflective polariser 202 as rejected light are transmitted through optical valve 1 and incident on the prismatic reflective film 200 that may include reflective layer 201, such as an aluminium or silver material. The prismatic reflective film 200 a linear array of pairs of reflective corner facets 203, 205. The corner facets 203, 205 are inclined in opposite senses in a common plane so that the individual light rays 212 undergo a reflection from a pair of the corner facets 212. That common plane in which the corner facets 203, 205 are inclined is oriented around the normal to SLM 48 so that the rear reflector converts the polarisation of the rejected light supplied back to spatial light modulator into the first polarisation on reflection from a pair of corner facets. This may be achieved by the common plane extending at 45° to the polarisation of the second polarization component at the prismatic reflective film 200.

Thus as shown in FIG. 20, light rays 212 are reflected by both facets 203, 205 of the prismatic film and may be substantially retroreflected as shown. Light rays 234 are incident at an angle of 45° with respect to the elongate prismatic facets 203, 205 of the prismatic film 200. After the double reflection, a polarisation rotation is achieved so that polarisation state 234 is rotated to polarisation state 236 due to the respective phase changes on reflection at each inclined facet. Thus light ray 212 output through the spatial light modulator 48 has the polarisation state 236 that is substantially the same as the polarisation state of rays 212. Advantageously the present embodiments achieve increased broadband polarisation rotation without the requirement for complex retarder stacks and thus may achieve high brightness output viewing windows with reduced cost.

Figure 22:
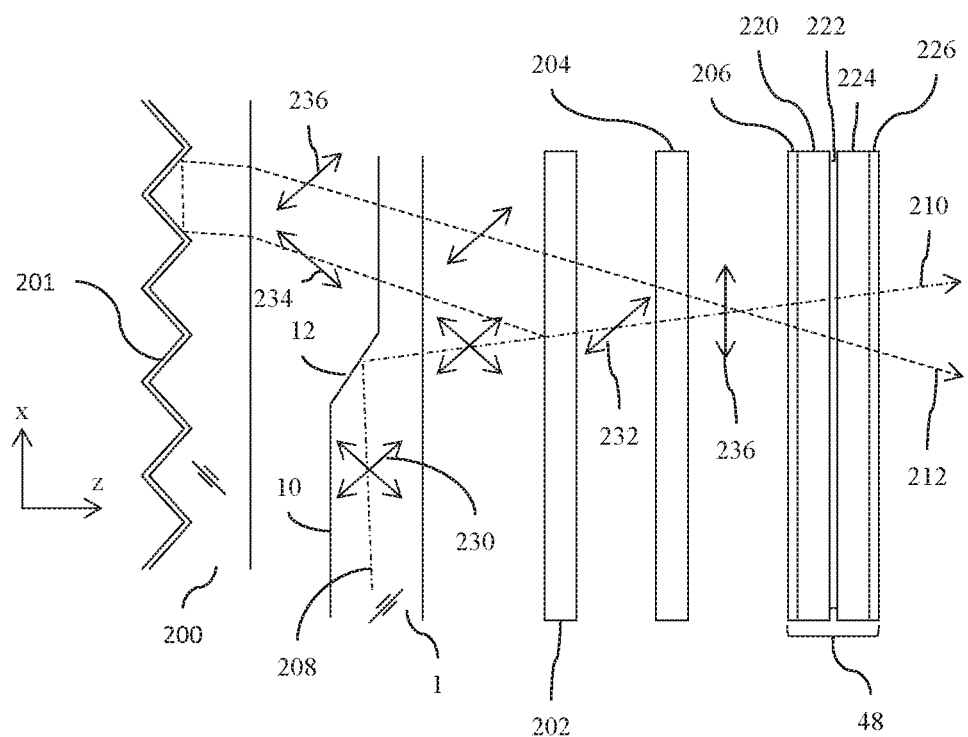
FIG. 22 is a schematic diagram illustrating a side view of a detail of a further polarisation recovery embodiment, in accordance with the present disclosure.

FIG. 22 is a schematic diagram illustrating a side view of a detail of a further polarisation recovery embodiment. This embodiment is similar to the embodiment of FIG. 20, however the prismatic film 200 is reversed. Such an arrangement can achieve polarisation rotation over wider illumination angles due to the refraction at the front surface of the film 200. Further, retarder layers can be incorporated within the film 200 to achieve further control of polarisation rotation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A polarized directional illumination apparatus, comprising:
    an imaging directional backlight comprising:
        a waveguide for guiding light, further comprising:
            a first light guiding surface operable to direct light from an illuminator array in a first direction; and
            a second light guiding surface, operable to allow light to exit the waveguide; and
        a light input surface operable to receive light from the illuminator array;
    a polarization sensitive reflector configured to receive light from the waveguide on a first side of the reflector, transmit a first portion of the received light having a first polarization state therethrough towards a second side of the reflector, and reflect a second portion of the received light having a second polarization state back towards the waveguide; and
    a retarder configured to receive reflected light from the polarization sensitive reflector and substantially alter the polarization state of the reflected light from the second polarization state to the first polarization state.

2. The polarized directional illumination apparatus of claim 1, further comprising a retarder film proximate to the second light guiding surface of the waveguide to alter the polarization state of reflected light.

3. The polarized directional illumination apparatus of claim 1, wherein the waveguide is a wedge type directional backlight.

4. The polarized directional illumination apparatus of claim 3, wherein the wedge type directional backlight is coated with alternating high refractive index material and low refractive index material.

5. The polarized directional illumination apparatus of claim 3, wherein the first light guiding surface of the wedge type directional backlight is coated with a reflecting layer.

6. The polarized directional illumination apparatus of claim 1, wherein the waveguide is an optical valve.

7. The polarized directional illumination apparatus of claim 5, wherein the optical valve has a stepped surface coated with a reflecting material.

8. The polarized directional illumination apparatus of claim 7, wherein the optical valve is substantially transparent.

9. The polarized directional illumination apparatus of claim 1, wherein the polarization sensitive reflector is a multi-layer birefringent film.

10. The polarized directional illumination apparatus of claim 9, wherein the polarization sensitive reflector is a periodic metal wire grid structure provided on glass.

11. The polarized directional illumination apparatus of claim 9, wherein the polarization sensitive reflector is a metal grid structure provided on film stock.

12. The polarized directional illumination apparatus of claim 1, wherein the retarder comprises a quarter-wave plate.

13. An imaging directional backlight comprising:
    an input side located at a first end of a waveguide, wherein the input side is operable to receive light from at least an illuminator array;
    a reflective side located at a second end of the waveguide;
    a first light directing side and a second light directing side located between the input side and the reflective side of the waveguide, wherein the second light directing side is operable to allow light to exit the waveguide;
    a polarization sensitive reflector configured to receive light from the waveguide on a first side of the reflector, transmit a first portion of the received light having a first polarization state therethrough towards a second side of the reflector, and reflect a second portion of the received light having a second polarization state back towards the waveguide; and a retarder configured to receive the reflected light from the polarization sensitive reflector and alter the polarization state of the reflected light from the second polarization state to the first polarization state.

14. The imaging directional backlight of claim 13, wherein the retarder comprises a quarter-wave plate.

15. An optical valve system that provides polarization recovery, comprising:
a waveguide for guiding light, wherein the waveguide further comprises:
a first light guiding surface; and
a second light guiding surface, opposite the first light guiding surface, further comprising at least one guiding feature and a plurality of extraction features, wherein the plurality of extraction features allow light to pass with substantially low loss when the light is propagating in a first direction and allow light to exit the waveguide upon encountering at least a first extraction feature of the plurality of extraction features;
a spatial light modulator proximate to the waveguide;
a polarization sensitive reflector configured to receive light from the waveguide on a first side of the reflector, transmit a first portion of the received light having a first polarization state therethrough towards a second side of the reflector, and reflect a second portion of the received light having a second polarization state back towards the waveguide, and
a retarder configured to receive reflected light from the polarization sensitive reflector and alter the polarization state of the reflected light from the second polarization state to the first polarization state.

16. The optical valve system that provides polarization recovery of claim 15, further comprising a quarter wave retarder plate located between the waveguide and the polarization sensitive reflector.

17. The optical valve system that provides polarization recovery of claim 16, further comprising a sheet polarizer operable to function as a clean up polarizer and located in a light path after the polarization sensitive reflector.

18. The optical valve system that provides polarization recovery of claim 17, wherein the optical valve further comprises a stepped surface coated with a reflecting material.

19. The optical valve system that provides polarization recovery of claim 18, wherein the reflecting material is silver.

20. The optical valve system that provides polarization recovery of claim 18, wherein the polarization sensitive reflector is approximately parallel to the stepped surface.

21. The optical valve system that provides polarization recovery of claim 15, wherein the retarder comprises a quarter-wave plate.

* * * * *